United States Patent
Jahnle

(10) Patent No.: US 12,508,769 B2
(45) Date of Patent: *Dec. 30, 2025

(54) METHOD FOR OPERATING A PRINTHEAD FOR A 3D PRINTER AND PRINTHEAD FOR A 3D PRINTER FOR CARRYING OUT THE METHOD

(71) Applicant: Robert Bosch GmbH, Stuttgart (DE)

(72) Inventor: Hendrik Jahnle, Leutenbach (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

This patent is subject to a terminal disclaimer.

(21) Appl. No.: 18/550,704

(22) PCT Filed: Mar. 10, 2022

(86) PCT No.: PCT/EP2022/056235
§ 371 (c)(1),
(2) Date: Sep. 15, 2023

(87) PCT Pub. No.: WO2022/194675
PCT Pub. Date: Sep. 22, 2022

(65) Prior Publication Data
US 2024/0217175 A1    Jul. 4, 2024

(30) Foreign Application Priority Data
Mar. 18, 2021   (DE) .................... 10 2021 202 640.0

(51) Int. Cl.
*B29C 64/209* (2017.01)
*B29C 64/106* (2017.01)
(Continued)

(52) U.S. Cl.
CPC .......... *B29C 64/209* (2017.08); *B29C 64/106* (2017.08); *B29C 64/255* (2017.08);
(Continued)

(58) Field of Classification Search
CPC ... B29C 64/209; B29C 64/106; B29C 64/255; B29C 64/295; B29C 64/321;
(Continued)

(56) References Cited

U.S. PATENT DOCUMENTS

| 3,980,208 A | 9/1976 | Hehl et al. |
| 2002/0029094 A1* | 3/2002 | Koreishi ................. B22F 10/80 700/118 |

(Continued)

FOREIGN PATENT DOCUMENTS

| DE | 102016222306 A1 | 5/2018 |
| DE | 102019217113 A1 | 9/2020 |

(Continued)

OTHER PUBLICATIONS

Translation of International Search Report for Application No. PCT/EP2022/056235 dated May 31, 2022 (2 pages).

(Continued)

*Primary Examiner* — Michael M. Robinson
(74) *Attorney, Agent, or Firm* — Michael Best & Friedrich LLP

(57) ABSTRACT

The invention relates to a method (200) for operating a printhead (10) for a 3D printer.
According to the invention, the method (200) comprises the following steps:
filling (210) a cavity (40) with printable material (10) by means of a feed device (2);
closing (220) an opening cross-section (21) of a piston bushing (4) by the advance of a piston (3) starting from a starting position (3a) in the direction of a nozzle (8) of the printhead (100);
converting (230) the material from a solid phase (10) via a plastic phase (11) into a liquid phase (12);
compressing (240) the material (10, 11, 12);

(Continued)

determining (250) a spring constant of the liquid phase (12);
print preparation (260) of the liquid phase (12);
dispensing (270) the liquid phase (12) of the material (10) from the nozzle (8) for printing a three-dimensional component (9);
returning (280) the piston (3) to the starting position (3a) and
repeating (290) the steps (210) to (280) until terminating the method (200).

The invention also relates to a printhead (100) for a 3D printer for carrying out the method (200) according to the invention.

17 Claims, 12 Drawing Sheets

(51) Int. Cl.
| | | |
|---|---|---|
| *B29C 64/255* | (2017.01) | |
| *B29C 64/295* | (2017.01) | |
| *B29C 64/321* | (2017.01) | |
| *B29C 64/329* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/295* (2017.08); *B29C 64/321* (2017.08); *B29C 64/329* (2017.08); *B29C 64/393* (2017.08); *B33Y 10/00* (2014.12); *B33Y 30/00* (2014.12); *B33Y 50/02* (2014.12)

(58) Field of Classification Search
CPC ................ B29C 64/329; B29C 64/393; B29C 2948/92028; B29C 2948/9238; B29C 48/02; B29C 48/05; B29C 48/266; B29C 48/288; B29C 48/475; B29C 48/92; B29C 64/118; B29C 64/314; B29C 64/343; B29C 48/143; B29C 2948/92209; B29C 2948/92514; B29C 2948/92523; B33Y 10/00; B33Y 30/00; B33Y 50/02; B33Y 40/10; B22F 10/18; B22F 12/53

See application file for complete search history.

(56) References Cited

U.S. PATENT DOCUMENTS

| | | |
|---|---|---|
| 2016/0082627 A1 | 3/2016 | Kilim et al. |
| 2019/0263064 A1* | 8/2019 | Von Burg ............. B29C 64/357 |
| 2020/0039146 A1 | 2/2020 | Jahnle et al. |
| 2020/0189187 A1* | 6/2020 | Streicher ................ B29C 64/20 |
| 2020/0238602 A1* | 7/2020 | Normile ................ B33Y 40/10 |

FOREIGN PATENT DOCUMENTS

| | | |
|---|---|---|
| JP | H0166404 U | 4/1989 |
| JP | H07125024 A | 5/1995 |
| JP | 2000043983 A | 2/2000 |
| JP | 2019533593 A | 11/2019 |
| JP | 2020157598 A | 10/2020 |
| WO | 2018086792 A1 | 5/2018 |

OTHER PUBLICATIONS

Non-final Office Action issued by the U.S. Patent Office for U.S. Appl. No. 18/550,712 dated Sep. 24, 2025 (8 pages).

* cited by examiner

Fig. 7
Fig. 7a
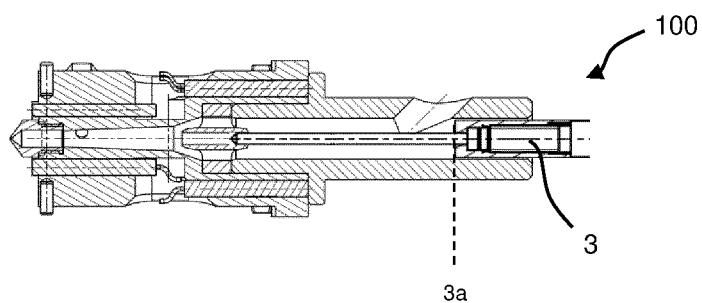
Fig. 7b
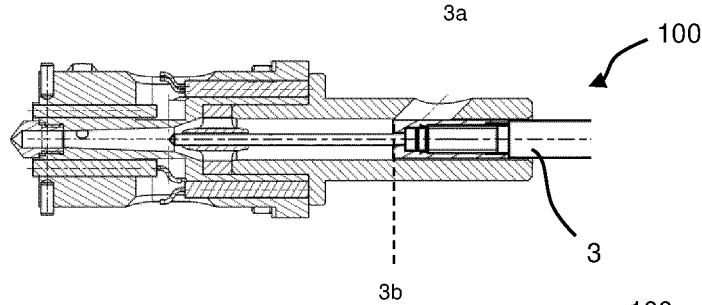
Fig. 7c
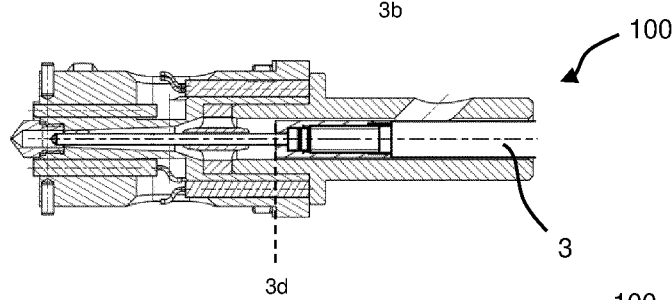
Fig. 7d
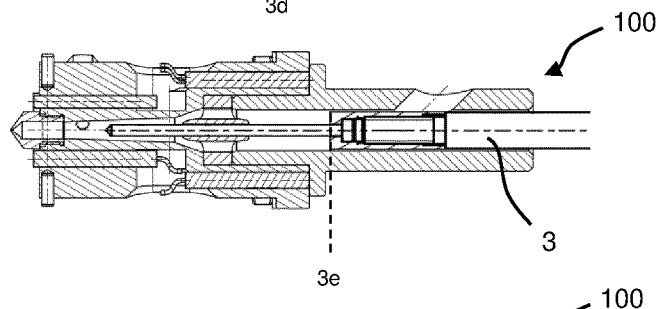
Fig. 7e
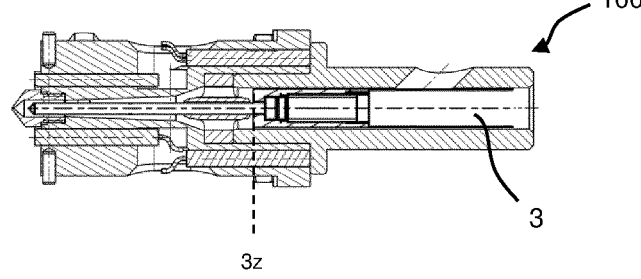

Fig. 8
Fig. 8a
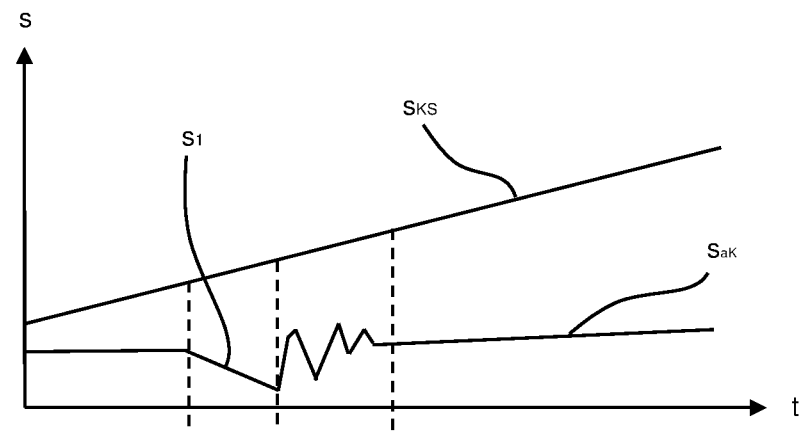
Fig. 8b
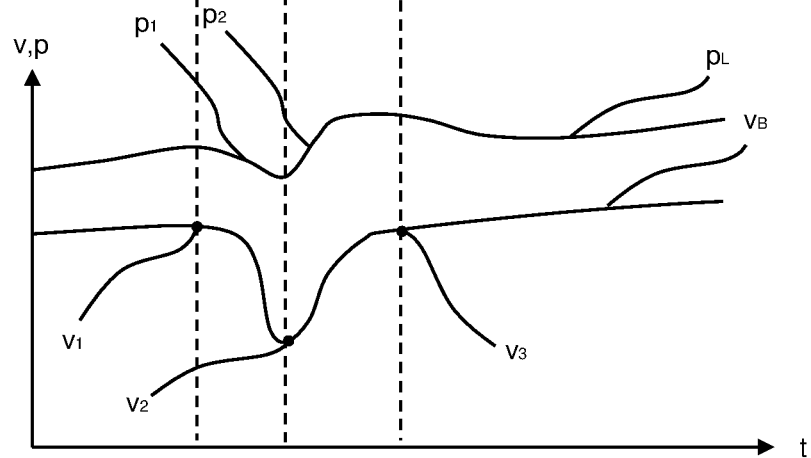

METHOD FOR OPERATING A PRINTHEAD FOR A 3D PRINTER AND PRINTHEAD FOR A 3D PRINTER FOR CARRYING OUT THE METHOD

BACKGROUND

The present invention relates to a method for operating a printhead for a 3D printer and printhead for a 3D printer for carrying out the method.

A 3D printer for a material that varies in viscosity receives a solid phase of said material as the starting material, generates a liquid phase therefrom, and selectively brings this liquid phase to the points associated with the object to be produced. Such a 3D printer comprises a printhead, in which the starting material is made ready for printing. Furthermore, means are provided for generating a relative movement between the printhead and the work surface on which the object is to be created. Either the printhead only, the work surface only, or both the printhead and the work surface can be moved.

The printhead has a first operating state in which liquid material exits from it and a second operating state in which no liquid material exits from it. For example, the second operating state is assumed when another position on the work surface is approached and no material is to be discharged on the path. For example, switching can be done between the two operating states of the printhead, in that the forward drive of the solid starting material can be switched on or off.

The most common is fused deposition modeling (FDM), in which a filament is melted from the starting material in an electrically heated extruder nozzle and discharged layer by layer on a platform. In the form of such a filament, the starting material is very expensive.

US 2016/082 627 A1 proposes feeding the starting material into granulate form and conveying with screw conveyor to a heated zone from which it exits in plastic form. On the one hand, granulate is significantly cheaper, and on the other hand, mixtures of different thermoplastic materials can be easily produced in this way.

Further, a printhead is known from DE 102016222306 A1, wherein a granule is plasticized therein via a piston and a heated path. As the piston presses on the granule, it is compressed and conveyed to a plasticization zone at the bottom of the printhead. Forces occur that can strain the piston and a cylinder wall of the printhead and lead to increased wear on the cylinder wall of the printhead housing. Further disclosed is a complex melting geometry with a heat conduction structure, wherein the heat conduction structure introduces a heating power of a heating element into the plasticized material to bring it into a liquid phase of the material.

SUMMARY

The invention is based on the task of providing a method for operating a printhead for a 3D printer and a printhead for a 3D printer, wherein the method and the printhead enable high dynamics and a stable printing process.

In the context of the invention, a method for providing printable melt for operating a printhead for a 3D printer was developed. Furthermore, a printhead for a 3D printer was developed to carry out the method.

According to the invention, the method comprises the following steps:
filling a cavity with printable material using a feed device,
closing an opening cross-section of a piston bushing by advancing a piston from a starting position in the direction of a nozzle of the printhead,
converting the material from a solid phase to a liquid phase via a plastic phase,
compressing the material,
determining a spring constant of the liquid phase,
print preparation of the liquid phase for a printing process,
dispensing the liquid phase of the material from the nozzle for printing a three-dimensional component;
retracting the piston to the start position, and
repeating steps until terminating the method.

In a further development of the invention, at least the closing, the conversion, the compressing, the determining of the spring constant, the print preparation and the dispensing are performed by an active regulation of an actuator device by a control and regulation unit, wherein results from an evaluation unit based on measured values of sensors are transmitted to the control and regulation unit.

The invention also relates to a printhead for a 3D printer for carrying out the method according to the invention. The printhead comprises an actuator device arranged in a housing of the printhead for actuating the piston, the feed device for the printable material, a flange that is arranged on the housing and the feed device and comprises a cooling device, the nozzle head with heating elements for converting the material from a solid phase via a plastic phase into a liquid phase, and the nozzle for dispensing the liquid phase of the material from the nozzle head, wherein, according to the invention, the control and regulation unit is provided for active regulation of the actuator device for moving the piston according to an operating strategy to be performed for filling and printing and for active regulation of the heating elements.

In a further development of the printhead, the evaluation unit is provided to evaluate measured values from sensors of the printhead and to transmit the results to the control and regulation unit for active regulation of the actuator device and for active regulation of the heating elements.

The evaluation unit can be designed to be separate from the control and regulation unit or integrated into it.

By recording and evaluating the sensor values as a function of the respective operating states, it is possible to check the functionality of the printhead, whereby errors or deviations in the process can be represented in an advantageous manner at an early stage. Furthermore, defined target values can be controlled by the acquisition of the sensor values. It is also possible that correction factors are calculated and transmitted to the control and regulation unit. These can be added to the target values, for example, to advantageously achieve a desired and constant dispensing of the melt from the nozzle.

Active regulation of the heating elements enables dynamic regulation of the temperature, which advantageously influences both heating and cooling. For example, if the heating energy of the first heating element is reduced by the control and regulation unit, then the cooling in the flange continues and this extracts the energy from the plastic phase of the material, whereby it cools abruptly.

Furthermore, the active regulation of the actuator device and the heating elements enables material to be discharged from the nozzle as required, wherein varying path speeds of the printhead can be compensated for by the actively controlled discharged volume of material. Active regulation therefore offers advantages over conventional NC systems, which always discharge the same volume regardless of their path speed, or control the quantity being discharged at a constant advancing rate without actively controlling this process.

The actuator device for actuating the piston can, e.g., be an electric motor with a mechanical transmission, or a hydraulic drive with a hydraulic pressure source.

An electric motor as an actuator device has a lower weight compared to a hydraulic drive and thus advantageously provides for a high dynamic of the entire printer and the printing process, since less mass must be accelerated.

A hydraulic drive advantageously achieves high forces when actuating the piston.

The feed device for the printable material can in particular be used as a supply for a material present as granulate, or starting material. The starting material can in particular be a thermoplastic material.

It has been found that by using granulate as the starting material over printheads using filaments made of thermoplastic material, specific advantages are achieved, particularly in the cost for the starting materials of the printer.

Compared to a printhead which transports granulate with a screw conveyor, the printhead according to the invention can be constructed more compactly. This in turn results in the printhead being lighter and easier to move. This is particularly advantageous if the printhead is to be moved very quickly, in particular at speeds of 100 mm/s or more.

The flange comprises a cooling device, whereby an optimized thermal management is achieved in the area of the feed device, so that gluing of the material or the granulate on the piston is advantageously avoided. Furthermore, the nozzle head has heating elements for converting the material from a solid phase, in particular granulate, into a liquid phase. The heating elements in the nozzle head advantageously ensure the targeted introduction of the heating power into the material to be melted. The liquid phase, or melting can subsequently be dispensed through the nozzle head by piston motion.

The piston bushing is designed as a separate piston bushing for guiding the piston and enables the piston to be guided directly in the piston bushing and no longer in the housing or a cylinder of the printhead. Thus, it is advantageously achieved that possible wear no longer occurs directly on the inner wall of the housing or the cylinder, but within the piston bushing. The piston bushing as a separate component offers the advantage that it can be replaced if necessary. In addition, it is possible to use matched pistons and piston bushings with different diameters without further design modifications, for example to the flange and the nozzle head.

In a further development of the method, filling the cavity (in particular a heatable cavity) with printable material using the feed device comprises at least the following steps:
 filling of the material or granulate pieces via an opening of the feed device into the printhead and
 the generation of air pulses to detach the granulate pieces from each other.

In a further development, the filling of the granulate pieces is performed manually or automatically, wherein the granulate pieces slide into the lower area of the feed device due to the influence of gravity.

In a preferred further development of the filling process, the generation of air pulses is performed at intervals and the granulate pieces are flung up in the area of the air pulses such that, when they fall down again, they exert an impulse on the underlying granulate pieces and encourage them to slide into the heated cavity of the printhead.

The process of effective refilling requires blowing behind the granulate, whereby an effect of lifting the granulate arises, so that it subsequently slides into the printhead. The spinning or whirling up is necessary for an automated application and the resulting gravity impulse or impact causes the granulate to slip in an advantageous manner. If necessary, the air pulses can also be used to loosen jammed granulate, whereby downtimes of the printhead are advantageously avoided.

In a further development of the method, the closing of the opening cross-section of the piston bushing by the piston comprises the following steps:
 advancing the piston, starting from the starting position of a piston crown of the piston in the direction of the nozzle until reaching a position below a gate of the piston bushing, wherein
 shearing of the granulate is achieved by sliding the piston crown past the gate.

The piston bushing has an upper partial area projecting into the flange and a lower partial area projecting into the nozzle head. As a result, the upper partial area is arranged in the effective area of a cooling zone of the cooling device of the flange and the lower partial area is arranged in the effective area of a heating zone of the nozzle head, whereby an effective energy removal from the material within the cooling zone or an effective energy supply into the material within the heating zone is achieved in an advantageous manner.

An opening, or opening cross-section, is arranged in the upper partial area of the piston bushing, which enables material to be fed from the feed device into the piston bushing. The gate, which is formed at an obtuse angle to the inner surface of the piston bushing is arranged on the lower area of the opening. The gate area is hardened, or alternatively designed as a separate hardened insert. When the piston closes the opening, material or granulate is sheared off from the piston at the gate, whereby a strong mechanical load acts on this part of the piston bushing. The separate piston bushing and the hardened area of the gate advantageously provide a longer service life and faster replacement of a defective component.

In a further development of the method, converting the material from a solid phase to a plastic phase to a liquid phase comprises the following steps:
 heating of the material by heating elements of the nozzle head across state zones of the printhead, wherein the state zones represent an aggregate state of the material depending on its temperature $T_S$ and the aggregate state of the material across the state zones is effected from a solid phase via a plastic phase into a liquid phase by the introduction of heating energy of the heating elements and
 mixing the material during compressing.

Starting from the upper partial area of the piston bushing via a kidney piece to the nozzle, the printhead has various state zones, wherein the state zones represent an aggregate state of the material as a function of its temperature $T_S$. In this case, the aggregate state of the material can be changed across the state zones from a solid phase to a plastic phase to a liquid phase.

It is advantageous that the state zones of the printhead comprise a cold zone with material in solid phase, a plasticizing zone with material in plastic phase, a melting zone and a process zone each with material in liquid phase, and a mixing zone with material in plastic and liquid phase.

Furthermore, the cooling device in the flange and a piston cooling system integrated in the piston are designed to keep the temperature $T_S$ of the plastic phase of the material in the plasticizing zone below a glass transition temperature $T_g$, above which the material would plasticize and change into a liquid phase.

Advantageously, this is equivalent to the piston crown being in contact only with the solid phase of the material and not with a fully plasticized phase. The fully plasticized phase has a tough, sticky consistency with a high tendency to surface adhesion. If the piston comes into contact with this phase, it can stick to it, whereby, for example, the trickling of fresh granulate is impeded when the piston is retracted. This effect is avoided in an advantageous way.

To carry out the method, the nozzle head comprises two heating zones.

In the first heating zone, a partial area of the plasticizing zone, the mixing zone and a partial area of the melting zone are arranged, wherein a first heating element is arranged in the upper nozzle head such that the heating energy from the first heating element can be introduced into the material via the lower partial area of the piston bushing, the kidney piece and a partial section of the upper nozzle head.

In the second heating zone, a partial area of the melt zone and the process zone are arranged, wherein a second heating element is arranged in the lower nozzle head in such a way that the heating energy from the second heating element can be introduced into the liquid phase of the material via the lower nozzle head.

The arrangement of the two heating zones in the nozzle head ensures more effective thermal management of the printhead, since the heating energy of the first heating zone ensures advantageous pre-plasticization of the material without the material changing to the liquid phase. This advantageously ensures that the piston does not stick during compressing and that the printhead functions properly. This effect is optimized in interaction with the cooling device in the flange. Furthermore, the material is pre-plasticized in the plastic phase in such a way that the actuator device requires less force when advancing the piston, whereby smaller actuators can be used advantageously for advancing the piston. This reduces the cost of the system and leads to improved printhead dynamics, as the weight of the printhead is reduced. This allows the printhead to be accelerated and decelerated more effectively during a so-called path control to produce a component.

In the second heating zone, the melt is generated and the heating energy introduced ensures a relatively constant melt temperature throughout the melt chamber. The melt temperature can be controlled within the second heating zone in such a way that the material does not heat up too much. In this way, it can be advantageously avoided that, e.g., fission products are formed by too high a thermal load, primarily gases, which accelerate further decomposition of the material due to the pressures prevailing in the system and also directly negatively affect its quality.

For the most part, the processes of compressing and conversion take place simultaneously, as heating energy is introduced into the printhead via the two heating zones during both processes.

In a preferred further development of the invention, compressing of the material during the compressing process comprises the following steps:
  pre-compressing of the material by advancing the piston, closing of the nozzle,
  compressing of the material by advancing the piston and holding the piston in a holding position.

In a further development of the compressing process, the pre-compressing of the material is performed by advancing the piston in a pressure- and/or force-controlled manner, wherein pre-compressing is performed up to a position which is reached when a material-dependent gradient and/or a material-dependent gradient angle of a force and/or pressure curve is reached and/or exceeded.

In the next method step, the material is compressed by advancing the piston in a pressure-controlled manner with the nozzle closed, thereby moving to a stop position until a peak pressure is reached.

In a further development, during compressing, the nozzle is closed and a piston needle dips into a melt space of the nozzle head such that a part of the liquid phase from an upper partial area of the melt space is thereby displaced through openings of the kidney piece from the melt zone back into the mixing zone, whereby the part of the liquid phase mixes with the plastic phase from the plasticizing zone in the mixing zone.

In a further development, the piston is held in the holding position, wherein the pressure and temperature of the liquid phase are measured during the holding process and the measured values are checked by the evaluation unit for functional control of the compressing process.

Then, in a further development, while the piston is held in the holding position, the nozzle is closed and the piston needle is immersed in the melt space such that thereby a part of the liquid phase from the upper partial area of the melt space is displaced through the openings of the kidney piece from the melt zone back into the mixing zone, whereby the part of the liquid phase mixes with the plastic phase from the plasticizing zone in the mixing zone.

Pre-compressing is performed by force- or pressure-controlled actuation of the piston by the actuator device, wherein the target position of the piston crown is in the first third of the plasticizing zone, starting from the cold zone. The granulate is compressed in the plasticizing zone by the advance of the piston, wherein at the same time there is melt in the melting zone between the cavity and the nozzle. The plasticized granulate is thus pressed into the melt in the mixing zone.

By lowering the piston and, analogously, the piston needle in the direction of the nozzle, melt already emerges from the nozzle, whereby it is advantageously achieved that any air or air pockets that can still be present are displaced from the nozzle head. This frees up the nozzle.

After reaching the target position of pre-compressing, the nozzle of the printhead is closed.

To compress the material, the piston is advanced by the actuator device in a pressure-controlled manner until a defined peak pressure and thus a peak pressure position is reached. Thereby, in a further development of the method for operating the printhead during compressing, the nozzle is closed and the piston needle dips into the melt chamber in such a way that thereby a part of the liquid phase from the upper area of the melt chamber is displaced through the openings of the kidney piece from the melt zone back into the mixing zone, whereby the part of the liquid phase mixes with the plastic phase from the plasticizing zone in the mixing zone.

Subsequently, the so-called peak pressure position is held for a material-dependent predefined period of time, therefore the peak pressure position is also the holding position of the printhead.

In a further development of the method, while the piston is held in the holding position, the nozzle is closed and the piston needle is immersed in the melt chamber in such a way that as a result a part of the liquid phase from the upper area of the melt chamber is displaced through the openings of the kidney piece from the melt zone back into the mixing zone, whereby the part of the liquid phase mixes with the plastic phase from the plasticizing zone in the mixing zone.

The holding process displaces residual air and homogenizes the melt in mixing zone C. This advantageously achieves a better energy flow and produces a more homogeneous material. The reflowing melt becomes plastic and the granulate parts, which are pushed into the kidney piece, become molten. This creates a mixing of the material.

The holding process described here also advantageously serves to analyze and perform a system check of the printhead, since the following effects can arise when measuring the pressure of the print. An increase in the pressure in the melt would mean that the melt is outgassing, for example because the temperature of the melt is too high. Melt temperatures that are too high are not desirable, as air plasma can form, which would lead to chemical decomposition.

A sharp drop in melt pressure could mean, for example, that the printhead system is leaking or that there was still too much air in the system. This effect could occur if, for example, there was too much cold material in the cavity because the temperature management of the printhead was not optimally set.

In a further development, determining a spring constant of the liquid phase comprises the following steps:
  pressure-controlled return from the holding position after terminating the hold to a target position, which is reached when the melt pressure reaches a target pressure,
  determining the pressure difference between the peak pressure and the target pressure,
  determining the distance between the stop position and the target position and
  calculation of the spring constant of the liquid phase.

The spring constant results from the compressibility of the melt and leads to a correction factor, or shape factor, which is required for exact actuation of the piston by the actuator device.

Given the compressibility of the melt, for example, 1.2 volume units of a geometric piston travelled by the piston correspond to 1.0 volume units of a discharged volume of the melt. Without compressibility, the ratio would be 1:1.

By determining the spring constant of the melt, it is advantageously achieved that the actuator device can actuate the piston in a controlled manner, wherein the spring constant makes it possible, among other things, that the real discharge of the melt achieves the correct, calculated volumetric flow of the melt as a function of a path speed of the moving printhead during printing. In other words, the required amount of melt is applied to the component at each printing position at each path speed of the printhead.

In a further development, the print preparation of the liquid phase comprises the following steps:
  active decompression of the liquid phase by retracting the piston as a function of the spring constant,
  opening the nozzle and
  compressing the liquid phase at the start of printing.

During active decompression, the piston is retracted by approximately 1 to 2 millimeters depending on the spring constant determined, whereby it is advantageously achieved that no melt escapes from the nozzle or nozzle opening when it is opened. This would be the case with a further holding of the position due to the existing open system by the influence of gravity. At the same time, the melt is relieved in the same way as a spring.

Then further print preparation by compression begins.

The overall system of the printhead is a compressible system, since the melt can have a compression of about 20%, for example. Therefore, the volume displaced by the piston advance does not correspond to the volume of the discharged material, whereby inaccurate and irregular discharges can result. However, this is advantageously avoided by performing the method according to the invention.

In one further development, the dispensing of the liquid phase, i.e. printing, is performed in a pressure-controlled manner, wherein:
  the pressure in the melting cavity is permanently measured,
  the piston is actively actuated via the control and regulation unit, wherein the advance of the piston is adjusted by a correction factor as a function of pressure, wherein the correction factor results from the spring constant of the liquid phase of the material.

The measured pressure corresponds to the pressure created by discharge of the liquid phase onto the component and the correction factor is advantageous to compensate for the compressibility of the liquid phase.

The compression of the melt in the melt cavity at the start of printing is generated partly by friction at the nozzle opening of the nozzle when the melt is "pressed out" and partly by the resistance when printing onto the component or a substrate carrier on which the component is built.

Uniform discharge of the melt is achieved by intelligent regulation of the printhead, wherein asynchronous movements of the piston adjusted by the correction factor through the use of an electronic gear on the actuator device take place. The correction factor, which results in particular from the determined spring constant of the melt, is mixed into the system, so to speak. Therefore, the method according to the invention advantageously has no restriction to synchronous movements similar to conventional NC systems.

An electrically driven actuator device proves to be dynamic and very effective for this case.

Furthermore, the method advantageously allows a consistent and constant path thickness to be achieved from the first droplet.

Furthermore, advantages result from the design of the printhead, wherein the piston bushing can have a stop between the upper and lower partial areas, by means of which the flange and the nozzle head are separated from each other. The piston bushing and, in particular, the stop thus advantageously separate the cooled flange from the heated nozzle head, whereby they are not in contact with each other.

Furthermore, a kidney piece can be arranged on the lower partial area of the piston bushing, wherein the kidney piece has a centrally extending bore for receiving a piston needle of the piston.

The piston of the printhead comprises a first piston part for connection to the actuator device, as well as a piston head for connection to the first piston part and for receiving the piston needle. The first piston part is preferably designed as a hollow aluminum piston, whereby coolant can be passed through the first piston part, and thereby piston cooling is achieved in an advantageous manner. The piston head has an underside on the side facing the nozzle, wherein the piston needle protrudes from the center of the underside. The area of the bottom of the piston head minus the virtual area of the piston needle forms a piston area for generating pressure on the material. The underside of the piston head is cooled by the piston cooling and thus locally reduces the viscosity of the melt or the plastic material on the piston crown. This prevents liquid melt from flowing in the direction of the drive device, whereby advantageously jamming of the piston in the piston bushing as well as penetration of the melt into the drive device are prevented. In addition, the material detaches more easily from piston crown or the underside of the piston head when it is retracted, so that when the piston reaches a starting point, it can be easily refilled with material in a solid phase or granulate without residual material sticking to the piston crown.

A temperature sensor is preferably mounted on the underside of the piston head or on the piston crown. Due to this arrangement of the temperature sensor, a piston position-dependent thermal management of the printhead is possible, whereby a faster heating of the material is achieved without the melt coming into contact with the underside of the piston head. This can advantageously accelerate a filling process of the printhead.

The piston head is designed as a cylindrical component and is preferably made of a thermally resistant material. The combination of the first piston part being made of aluminum and the piston head being made of steel, for example, proves to be advantageous, as the piston thus has an elastic upper area for absorbing the mechanical stresses and a thermally resistant lower area in the area of the heated material.

Depending on the piston position, the piston needle projects only partially into or completely through the bore of the kidney piece, whereby the piston needle is guided in the centric bore of the kidney piece in an advantageous manner.

The kidney piece has concentrically arranged openings, wherein these form a fluidic connection between a cavity arranged in the piston bushing and a melt cavity arranged in a lower part of the nozzle head.

The cavity is located inside the piston bushing and is formed by a volume whose outer surface is formed by the inside of the piston bushing, the outside of the piston needle, the top of the kidney piece and the bottom of the piston.

Inside the cavity, the material, or the granulate, is compressed by the movement of the piston over the underside of the piston head, or the piston surface. During the compressing of the material, the thermal management of the printhead is set in such a way that no liquid phase of the material, or no melt, is formed inside the cavity, but the material is formed as a plastic phase. This advantageously ensures that no plasticized material adheres to the underside of the piston. However, during compressing, part of the liquid phase, or melt, in the melt chamber is forced out of the melt chamber into the cavity of the piston bushing through the concentrically arranged openings of the kidney piece by the piston needle entering the melt chamber. Thereby parts of the melt mix with parts of the plastic phase. Thereby the melt releases energy into the plastic phase, whereby advantageously a more homogeneous material is produced. The kidney piece thus forms a mixer, or a static mixer, since apart from the piston movement in an advantageous manner no other moving parts are required for mixing the plastic phase with the liquid phase. The configuration of the kidney piece thus advantageously provides an aperture effect, which leads to better mixing of the material, or the melt with the plasticized material.

The kidney piece conducts the heating energy of the heating element from the nozzle head into both the melt and the piston needle, which advantageously provides improved energy management when heating the melt.

The kidney piece can also be designed as a separate component or be integral with the piston bushing.

Furthermore, a pressure sensor for the pressure $p_L$, and/or a temperature sensor for the temperature TL of the liquid phase is arranged in the melting cavity.

The measurement of the pressure $p_L$ is the primary parameter that determines the dispensing, or discharge, or mass flow of melt from the outlet opening. An additional measurement of the temperature $T_L$ makes it possible to take into account the temperature dependence of the viscosity of the material when determining the mass flow Q. The quantity to be metered can be precisely controlled by the piston advance. For the quality of the manufactured component, or object, the control of the temperature $T_L$, especially in the form of a constant and accurate regulation, is even more important to avoid thermal degradation of the material.

In addition, a displacement measuring system for the position s of the piston, and/or a sensor for the force F exerted by the piston on the material or for a hydraulic pressure $p_H$ exerted on the piston, is provided on the actuator device and/or on the piston.

The advance of the piston is a measure of the amount of material to be discharged. This quantity can be controlled, among other things, via the displacement measuring system. Furthermore, the force F correlates directly with the pressure in the material.

Furthermore, a temperature sensor for the temperature $T_K$ of the plastic phase of the material is arranged on the piston, in particular on the underside of the piston head of the piston.

Due to this arrangement of the temperature sensor, a piston position-dependent thermal management of the printhead is possible, whereby a faster heating of the material is achieved without the melt coming into contact with the underside of the piston head. Doing so can advantageously accelerate a filling process of the printhead or reduce the time required for the filling process.

BRIEF DESCRIPTION OF THE DRAWINGS

Further measures for improving the invention are described in greater detail hereinafter on the basis of the drawings, together with the description of the preferred embodiment examples of the invention.

Shown are:

FIG. 7 different positions of a piston of the printhead according to the invention;

FIG. 8 diagrams of a piston path, a path speed of the printhead, and a pressure path;

DETAILED DESCRIPTION

Figure 1:
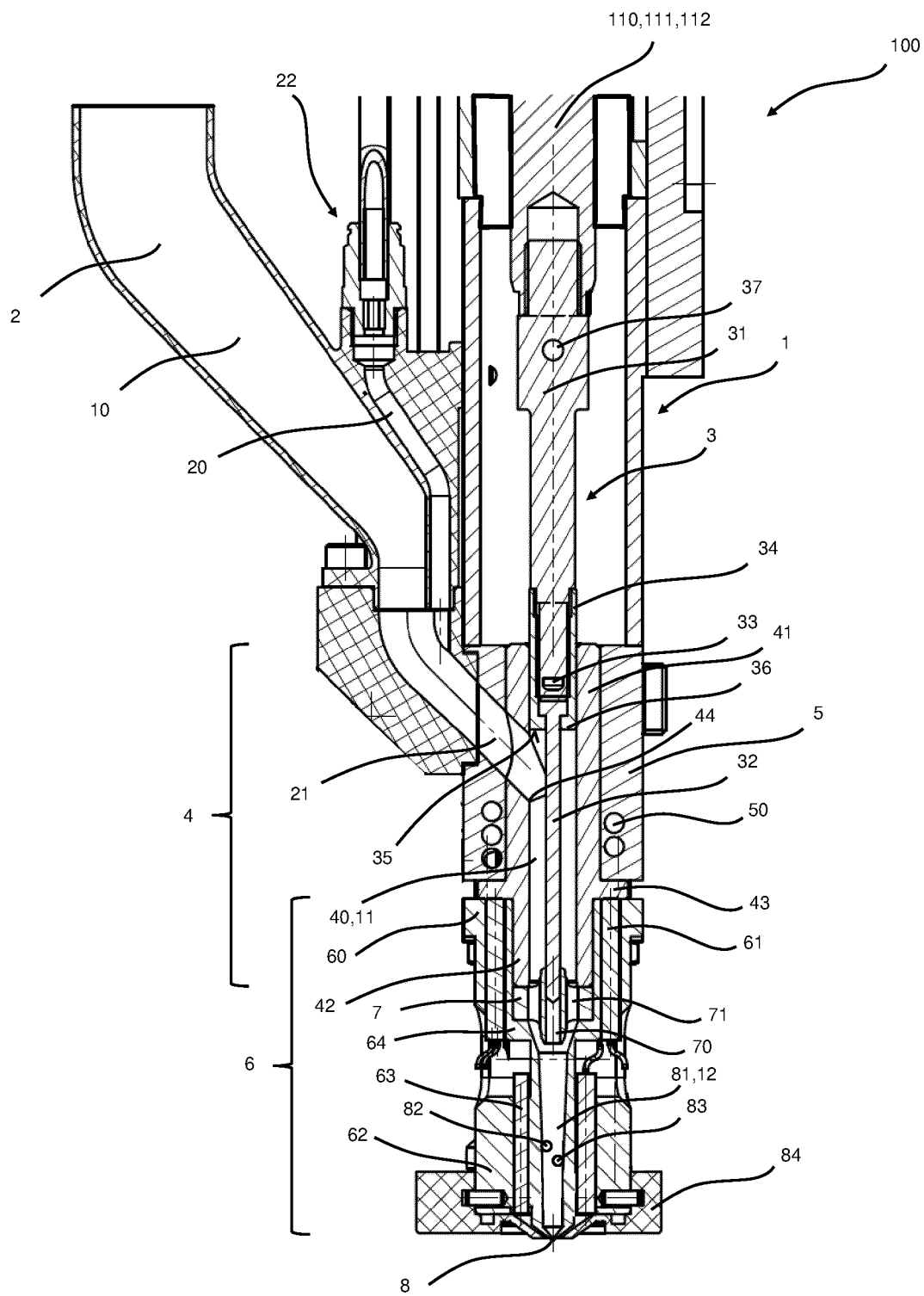
FIG. 1 a printhead according to the invention.

FIG. 1 shows a printhead 100 for a 3D printer, comprising an actuator device 110 which is arranged in a housing 1 of the printhead 100 for actuating a piston 3, a feed device 2 for a printable material 10, a flange 5 which is arranged on the housing 1 and the feed device 2 with a cooling device 50, a nozzle head 6 with heating elements 61, 63 in order to convert the material 10 from a solid phase 10 to a liquid phase 12 via a plastic phase 11, and a nozzle 8 for dispensing the liquid phase 12 of the material 10 out of the nozzle head 6. The printhead 100 comprises a separate piston bushing 4 for guiding the piston 3.

The flange 5, which is internally cooled by the cooling device 50, provides thermal separation of the lower heated area of the printhead 100 from the actuator device 110, or from the drive of the piston 3.

The piston 3 comprises a first piston part 31 for connecting the piston 3 to the actuator device 110, a piston head 34 which is attached to the first piston part 31 and receives a piston needle 32 in the direction of the nozzle 8. A temperature sensor 36 for measuring the temperature $T_K$ of the plastic phase 11 of the material is arranged on the piston 3, or on an underside 35 of the piston head 34. The underside 35 of the piston head 34 forms a piston crown 35. The first piston part 31 is preferably designed as a hollow aluminum piston, wherein the interior of which has a cavity that is designed as a cooling duct. A piston cooling 33 is arranged at the lower end of the first piston part 31 and is cooled by a coolant system.

The piston cooling 33 ensures compressing of the material 11, 12 at the piston crown 35 and thereby seals the piston 3 in the direction of the actuator device 110, or thereby prevents liquid melt 12 from flowing in the direction of the actuator device 110. Preferably, a cooling liquid is used as the coolant, wherein this is conveyed through the housing 1 into a cooling port 37 of the first piston part 31 via ports and flexible lines.

The cooling device 50 in the flange 5 is supplied with coolant by the same coolant system.

The cooling of the material 11, 12 at the piston crown 35 locally reduces the viscosity of the material 11, 12, whereby it is detached from the piston 3 when it is retracted without drawing threads. This creates space for new material 10.

FIG. 1 shows the piston 3 in an initial position for filling the printhead 100 with printable material 10, which is fed into the printhead 100 via the feed device 2.

The feed device 2 is funnel-shaped, wherein the material 10, which is preferably a granulate, is filled from above into an opening of the feed device 2. The material 10 reaches an opening 21, or opening cross-section, to the piston bushing 4 by gravity. In the lower area of the feed device 2 above the opening 21, an air duct 20 is arranged. This is supplied with air pulses by a pneumatic valve 22. The pneumatic valve 22 and the air duct 20 form an injection device which applies air blasts to the granulate 10 at intervals in such a way that the granulate 10 are propelled in the direction of the area of the feed device 2 located further upstream, causing the individual granule pieces 10 to separate from one another. When the air flow is switched off, the granulate 10 located in the lower area of the feed device 2 fall into the piston bushing 4 with the opening cross-section 21 open.

The injection device of the feeding device 2 thereby prevents the granulate pieces 10 from jamming, whereby clogging of the feed device 2 is prevented, and it ensures that the piston bushing 4 is reliably filled with granulate 10. Furthermore, smaller diameters can be used in the inlet of the feed device 2.

The process of refilling requires blowing behind the granulate 10, whereby an effect of lifting the granulate occurs, so that it subsequently slides into the printhead 100. The whirling is necessary for an automated operation and the resulting gravity impulse, or impact, causes the granulate 10 to slip.

The piston bushing 4 has an upper sub-region 41 projecting into the flange 5 and a lower sub-region 42 projecting into an upper sub-region 60 of the nozzle head 6. A stop 43 is arranged between the upper 41 and lower 42 sub-regions of the piston bushing 4, by means of which the flange 5 and the nozzle head 6 are separated from each other. The opening 21, or opening cross-section, is arranged in the upper sub-region 41 of the piston bushing 4 and has a gate 44 on the inner surface of the piston bushing 4. The gate 44 causes granulate 10 to be sheared off between the gate 44 and the piston crown 35 when the opening cross-section 21 is closed by the piston 3, until the piston crown 35 reaches a position below the gate 44.

The piston bushing 4 has an obtuse angle at the gate 44, wherein this is sharp-edged and hardened. Local curing is an advantage here. In an alternative embodiment, the gate 44 can also be formed by a separate insert, analogous to an insert.

The design of the gate 44 advantageously ensures a reduction in the forces required to shear off the granulate 10, whereby energy can be saved and the materials of the piston bushing 4 and the piston 3 are less susceptible to wear. The edge of the gate 44 is extremely susceptible to wear.

A kidney piece 7 is arranged on the lower partial area 42 of the piston bushing 4, wherein the kidney piece 7 has a centrally extending bore 70 for receiving a piston needle 32 of the piston 3.

The kidney piece 7 also has concentrically arranged openings 71, which form a fluidic connection between a cavity 40 arranged in the piston bushing 4 and a melt cavity 81 arranged in a lower part 62 of the nozzle head 6. The cavity 40 is located inside the piston bushing 4 and is formed by the inside of the piston bushing 4, the outside of the piston needle 32, the top of the kidney piece 7 and the bottom 35 of the piston 3.

A preferred task of the kidney piece 7 is to conduct heat, or energy, from the heating elements 61, 63 of the nozzle head 6 into the liquid phase 12 of the material, or melt 12. This is achieved in particular by increasing the contact area with the cavity 40 and thus the plastic phase 11 of the material.

Another task is to guide the piston needle 32, wherein the contact of the piston needle 32 within the bore 70 additionally ensures that the piston needle 32 is heated to the required process temperature. The final process temperature is only reached in the nozzle head 6 towards nozzle 8.

During a filling operation of the printhead 100, the nozzle 8 is closed as required and when the piston 3 is actuated by the actuator device 110, the material 10, 11, 12 arranged in the cavity 40 and melting cavity 81 is compressed by the piston advancing.

The nozzle head 6 comprises the heating elements 61, 63 of the printhead 100, wherein a first heating element 61 is arranged in the upper nozzle head 60 and a second heating element 63 is arranged in the lower nozzle head 62. The upper nozzle head 60 has a subsection 64 arranged between the upper 60 and lower 62 nozzle heads, against which the kidney piece 7 rests. In the area of the nozzle 8, a cooling ring 84 is arranged on the nozzle head 6. This cools the component to be printed and it thermally shields the component from the printhead 100.

The heating elements 61, 63 in the nozzle head 6 heat the material 10, 11, 12 within the cavity 40, the kidney piece 7 and the melt chamber 82 until the liquid phase 12 of the material has reached its process temperature and can be discharged from the nozzle 8. The melt chamber 82 is configured to taper from the sub-part 64 of the upper nozzle head 60 to the nozzle 8. The conical inlet of the melt chamber 81 allows an increase of the volume flow and prevents the material from depositing on the inner wall of the nozzle head 6. By having less material 12, or volume, in a tapered melt chamber 81 relative to a cylindrical melt chamber 81, the mixing process is further optimized. As a result, the piston needle 32 must displace less volume to force parts of the melt 12 back through the openings 71 of the kidney piece 7 from the melt chamber 81 into the cavity 40 during compressing.

Furthermore, the printhead 100 comprises further sensors, wherein a pressure sensor 83 for the pressure $p_L$, and a temperature sensor 82 for the temperature $T_L$ of the liquid phase 12 of the material are arranged in the melt chamber 81. Further sensors are arranged on the actuator device 110, wherein a travel measurement system 111 for the position s of the piston 3, and a sensor 112 for the force F applied by the piston 3 to the material 10, 11 or for a hydraulic pressure $p_H$ applied to the piston 3. In an alternative embodiment, the sensors 111, 112 can also be arranged on the piston 3 of the printhead 100.

Figure 2:
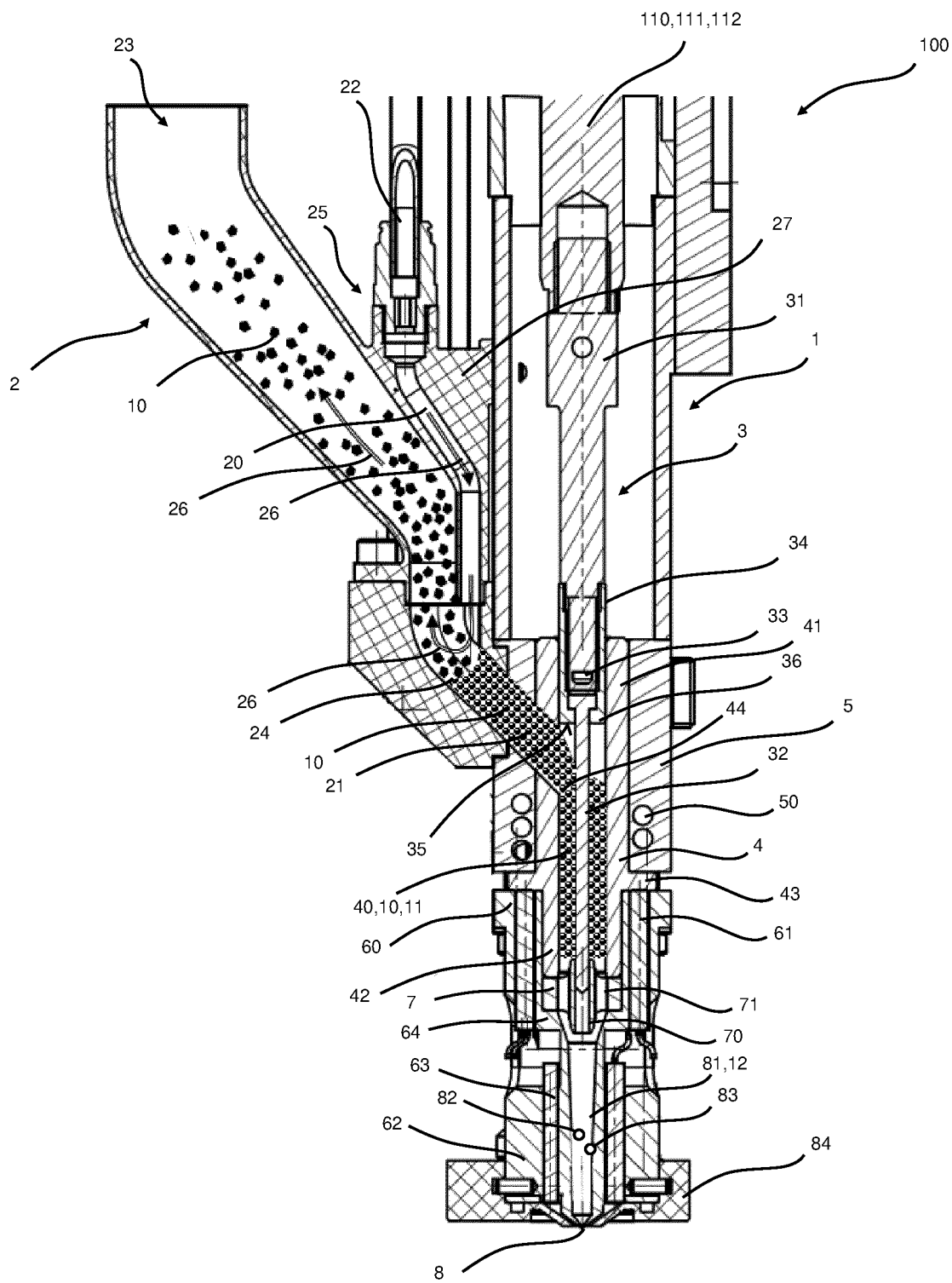
FIG. 2 a further illustration of the printhead according to the invention.

FIG. 2 shows another representation of the printhead 100 according to the invention, wherein according to the invention the solid phase 10 of the material comprises the granulate pieces 10 and the feed device 2 has the injection device 25 for detaching the granulate pieces 10 from each other.

The injection device 25 comprises the pneumatic valve 22 and the air duct 20, wherein the air duct 20 is arranged in a housing part 27 of the feed device 2 and opens in a lower area 24 of the feed device 2 above the opening cross-section 21 of the flange 5.

Air pulses 26 can be applied to the air duct 20 by the pneumatic valve 22, wherein the air pulses 26 act on the granulate particles 10 in the lower area 24 in such a way that they separate from one another.

The feed device 2 is funnel-shaped, wherein the granulate particles 10 are fed from above into an opening 23 of the feed device 2. The material 10 reaches the opening cross-section 21 of the flange 5 up to the piston bushing 4, or the opening cross-section 21 of the piston bushing 4, by gravity. In the lower area 24 of the feed device 2 above the opening cross-section 21 of the flange 5, an air duct 20 of the injection device 25 is arranged. Air pulses 26 are applied to the air duct 20 by the pneumatic valve 22. The injection device 25 comprises the pneumatic valve 22 and the air duct 20, wherein the granulate 10 is subjected to air blasts at intervals in such a way that the granulate 10 are propelled in the direction of the area of the feed device 2 located further upstream and the individual granulate particles 10 are thereby detached from one another. When the injection device 25 is switched off, the granulate 10 located in the lower area 24 of the feed device 2 falls into a cavity 40 of the piston bushing 4 when the opening cross-section 21 is open.

The injection device 25 of the feed device 2 thereby prevents jamming of the granulate particles 10, whereby clogging of the feed device 2 is prevented, and it ensures reliable filling of the piston bushing 4 with granulate 10. The process of refilling requires blowing behind the granulate 10, whereby an effect of lifting the granulate arises, so that it subsequently slides into the printhead 100. The whirling is necessary for an automated operation and the resulting gravity impulse, or impact, causes the granulate 10 to slip.

Figure 3:
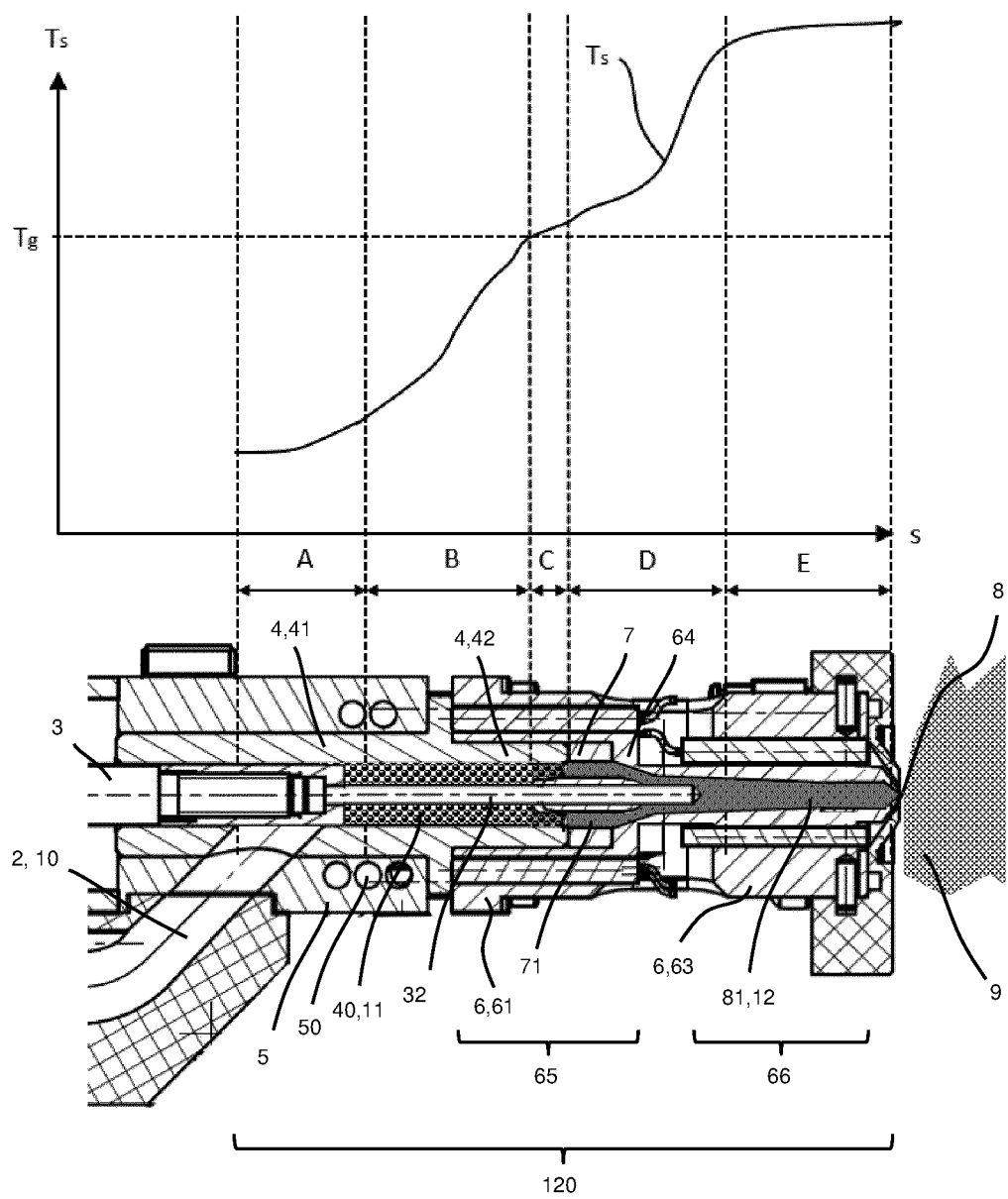
FIG. 3 a section of the printhead according to the invention.

FIG. 3 shows a section of the printhead 100 according to the invention in a view rotated by 90°, wherein starting from the upper partial area 41 of the piston bushing 4 via the kidney piece 7 up to the nozzle 8, state zones A, B, C, D, E of the printhead 100 filled with material 10, 11, 12 are shown during operation. The state zones A, B, C, D, E represent a state of aggregation of the material 10 as a function of its temperature $T_S$, wherein the state of aggregation of the material 10 is changeable across the state zones A, B, C, D, E from a solid phase 10 to a plastic phase 11 to a liquid phase 12.

The temperature $T_S$, or the temperature profile of the material 10, 11, 12 within the printhead 100 is shown in a diagram displayed above the printhead 100, wherein this is shown over the path s, or the length of a working area 120 of the printhead 100.

The state zones A, B, C, D, E of the printhead 100 comprise a cold zone A with material in solid phase 10, a plasticizing zone B with material in plastic phase 11, a melting zone D, and a process zone E in each case with material in liquid phase 12. Further, the state zones comprise a mixing zone C with material in plastic 11 and liquid 12 phases.

The cooling device 50 in the flange 5 and the piston cooling 33 integrated in the piston 3 are provided to keep the temperature $T_S$ of the plastic phase 11 of the material in the plasticizing zone B below a glass transition temperature $T_g$ even when the material 11 plasticizes and changes into a liquid phase 12. In the embodiments shown here, the plasticizing zone B with the material in plastic phase 11 describes a state of the material, or of the granulate, in which the viscosity of the granulate is already changing, whereby a compressing process and a mixing process are optimized, but the plastic phase 11 of the granulate does not just yet change into the liquid phase 12.

Furthermore, the nozzle head 6 comprises two heating zones 65, 66.

In the first heating zone 65, a sub-region of the plasticizing zone B, the mixing zone C and a sub-region of the melting zone D are arranged, wherein a first heating element 61 is arranged in the upper nozzle head 60 in such a way that the heating energy from the first heating element 61 can be introduced into the material 10, 11, 12 via the lower sub-region of the piston bushing 42, the kidney piece 7 and a partial section 64 of the upper nozzle head.

A sub-region of the melt zone D and the process zone E are arranged in the second heating zone 66, wherein a second heating element 63 is arranged in the lower nozzle head 62 such that heating energy from the second heating element 63 can be introduced into the liquid phase 12 of the material via the lower nozzle head 62.

It can be seen from the diagram that the temperature $T_S$ of the material 10, 11, 12 increases steadily along the path s of the working area 120 of the printhead 100. In the cold zone A, the action of the cooling device 50 of the flange 5 is predominant, whereby the granulate 10 is heated only slowly over the path s. From plasticizing zone B, the influence of the first heating zone 65 with the first heating element 61 begins to increase, wherein the temperature curve rises sharply until the glass transition temperature $T_g$ is reached, and from there the mixing zone C begins. The temperature $T_S$ continues to rise in the mixing zone C with a lower gradient until the melting zone D is reached. There, the influence zone of the second heating zone 66 begins with the second heating element 63, wherein the latter causes the temperature $T_S$ of the melt 12 to rise sharply until the process temperature of the melt 12 is reached in the process zone E and printable melt 12 has been produced.

The temperature $T_S$ must be set in such a way that the granulate 10 can trickle into the cavity 40 during filling without sticking, but are also preheated in such a way that shearing of the material 10, 11 at the gate 44 is possible with as little force as possible. The temperature management of the printhead 100 is thereby adjusted so that the cooling device 50 in the flange 5 introduces a cooling temperature of about 40° C. into the piston bushing 4 and thereby into the material 10, 11, and the first heating element 61 of the first heating zone 65 introduces a heating temperature of about 30° C. below the glass transition temperature $T_g$, or the melt temperature of the material 10, 11, 12.

This effect is supported by the piston cooling 33. The cooling of the material 11, 12 at the piston crown 35 locally reduces the viscosity of the material 11, 12, whereby it is detached from the piston 3 when it is retracted without drawing threads. This creates space for new material 10 when the piston 3 clears the opening cross-section 21 to the feed device 2.

The temperature sensor 36 at the piston crown 35 measures the temperature $T_K$ at the contact point of the piston 3 to the material 10, 11, whereby the cooling and heating power of the printhead 100 can be calculated so that the glass transition temperature $T_g$ of the material 10 is not exceeded. Due to the arrangement of the temperature sensor 36, or temperature sensor on the piston crown 35, it is possible to control the heating elements 61, 63 depending on the piston position and thus to adjust the temperature $T_S$. This results in faster heating of the material 11, 12. The thermal management of the printhead 100 thus also enables processing of plastics with low melting temperatures of less than 60 to 80° C.

During a compressing process to produce liquid phase 12 of the material in process zone E, nozzle 8 is closed. The nozzle 8 can be closed, for example, by a closure valve not shown, or by positioning the printhead 100 on a plate in the installation space of the printer. Furthermore, an already printed area of a component 9 can also be approached and the nozzle 8 thereby closed. During the compressing process, the piston needle 32 is immersed in the melt cavity 81 and continues to move into it in such a way that parts of the liquid phase 12 are thereby displaced from the melt zone D back into the mixing zone C whereby the liquid phase 12 mixes with the plastic phase 11 from the plasticizing zone B in the mixing zone C.

The liquid phase 12 from the melt zone D is thereby displaced from the upper area of the melt cavity 81 through the openings 71 of the kidney piece 7 back into the cavity 40 of the piston bushing 4 into the mixing zone C.

Figure 4:
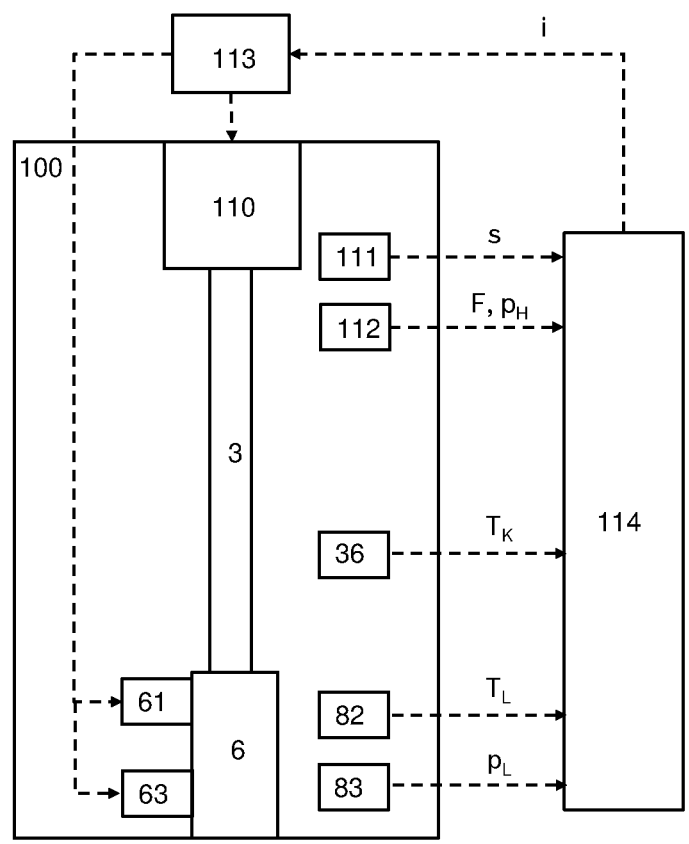
FIG. 4 a schematic illustration of the printhead according to the invention.

FIG. 4 shows a schematic representation of the printhead 100 according to the invention with a control and regulation unit 113 for active regulation of the actuator device 110 for moving the piston 3 and an evaluation unit 114, which is designed to evaluate the measured values of the sensors 36, 82, 83, 111, 112 and to communicate the results to the control and regulation unit 113 for active regulation of the actuator device 110 and for active regulation of the heating elements 61, 63.

The control and regulation unit 113 is provided for active regulation of the actuator device 110 for moving the piston 3 according to an operating strategy being performed for filling and printing, and for active regulation of the temperatures of the first 61 and second 63 heating elements.

The sensor signals received by the evaluation unit 114 and the results calculated from the respective values are decisive for the active regulation of the actuator device 110.

The pressure sensor 83 for the pressure $p_L$, and the temperature sensor 82 for the temperature $T_L$ of the liquid phase 12 are arranged in the melt chamber 81. The displacement measuring system 111 for the position s of the piston 3, and the sensor 112 for the force F exerted by the piston 3 on the material 10, 11 or for a hydraulic pressure $p_H$ exerted on the piston 3, are arranged on the actuator device 110 or on the piston 3.

Furthermore, the temperature sensor 36 for the temperature $T_K$ of the plastic phase 11 of the material is arranged on the piston 3.

The signals s, F, $p_H$, $T_K$, $T_L$, $p_L$ of the sensors 111, 112, 36, 82, 83, shown by dashed arrows, are transmitted to the evaluation unit 114, subsequently evaluated in this unit or in a cloud, and the results are transmitted to the control and regulation unit 113 as a control variable i according to an operating strategy, and the actuator device 110, as well as the heating elements 61, 63, are actuated accordingly.

Figure 5:
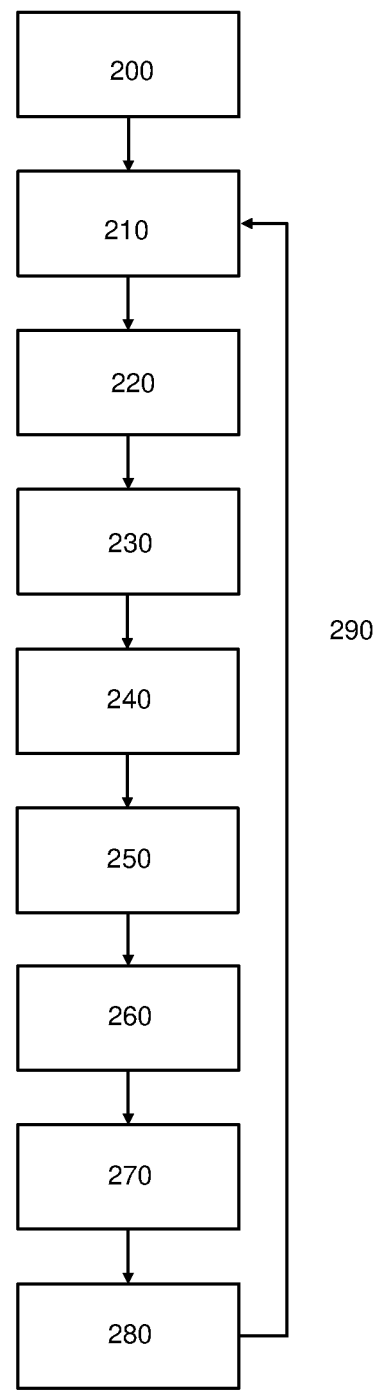
FIG. 5 a flowchart of a method for operating the printhead according to the invention.

FIG. 5 shows a flowchart of a method 200 according to the invention for operating the printhead 100 according to the invention, wherein the method 200 comprises the following steps:

filling 210 a cavity 40 with printable material 10 using a feed device 2, closing 220 an opening cross-section 21 of a piston bushing 4 by advancing a piston 3 from a starting position 3a in the direction of a nozzle 8 of the printhead 100, converting 230 the material from a solid phase 10 to a liquid phase 12 via a plastic phase 11, compressing 240 the material 10, 11, 12, determining 250 a spring constant of the liquid phase 12, print preparation 260 of the liquid phase 12, dispensing 270 the liquid phase 12 of the material 10 from the nozzle 8 for printing a three-dimensional component 9 retracting 280 piston 3 to start position 3a, and repeating 290 the steps 210 to 280 until terminating the method 200.

At least the closing 220, the converting 230, the compressing 240, the determining 250 of the spring constant, the print preparation 260 and the dispensing 270 of the method 200 are performed by an active regulation of the actuator device 110 by the control and regulation unit 113, wherein the results by the evaluation unit 114 based on the measured values of the sensors 36, 82, 83, 111, 112 are transmitted to the control and regulation unit 113.

The method steps are described in greater detail hereinafter.

Figure 6:
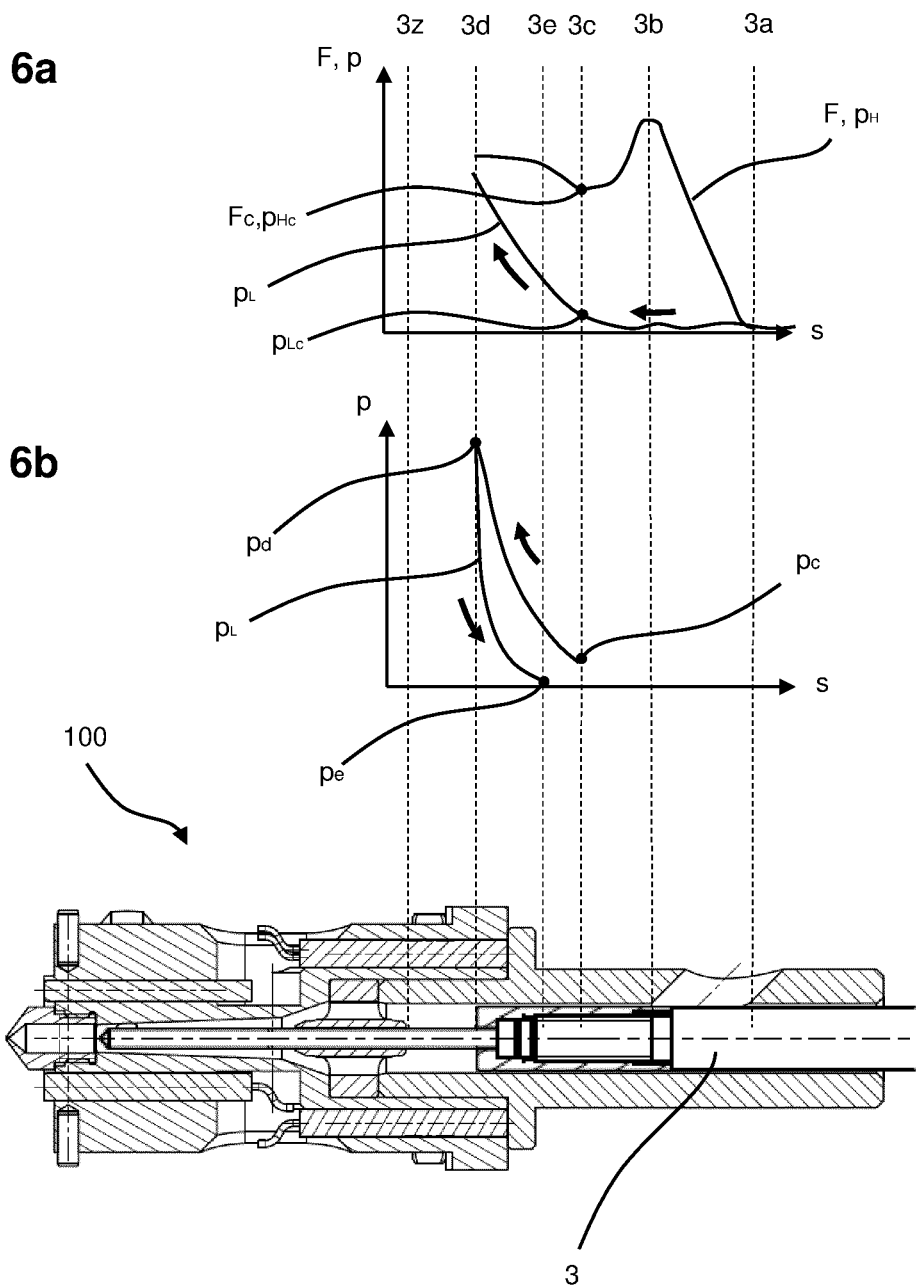
FIG. 6 a section of the printhead according to the invention with a pressure curve.

FIG. 6 shows a section of the printhead 100 according to the invention and two diagrams 6a, 6b, which illustrate a pressure, or pressure, force curve during operation, or various method steps of the method 200 for operating the printhead 100. FIG. 7 shows the different positions of the piston 3 at the different method steps or states from FIG. 6 starting at the start position 3a to the end position 3z of the piston crown 35. During the performance of the method steps, the cooling devices 50, 33 in the flange 5 and piston 3, as well as the heating elements 61, 63 are active and the melt cavity 81, as well as the kidney piece 7 are filled with melt 12 and in the lower partial area of the cavity 40 there is still granulate in plastic phase 11.

The sections of the illustrated printhead 100 correspond to those of the printhead 100 according to the invention illustrated in FIGS. 1, 3, and 4, so that the reference numbers of the previous drawings are used to describe FIGS. 6 and 7, wherein new features and references, e.g., the respective position of the piston 3 with reference to the piston crown 35 is indicated in FIGS. 6 and 7.

FIG. 6 shows in the first diagram 6a two curves which are plotted over the path s covered by the piston 3. The path s is measured by the path measuring system 111, or path sensor 111 on the actuator device 110 or on the piston 3.

The upper curve represents a force, pressure curve for the force F exerted by the piston 3 on the material 10, 11 or for the hydraulic pressure $p_H$ exerted on the piston 3 during the advancing of the piston 3 by the actuator device 110 during closing 220 and compressing 240, wherein the force or pressure sensor 112 is arranged on the actuator device 110 or on the piston 3.

The lower curve in diagram 6a represents a pressure curve of the melt pressure $p_L$ in the melt cavity 81 over the path s of the piston 3 during compressing 240. The pressure sensor 83 for the pressure $p_L$ of the liquid phase 12, or the melt 12, is arranged in the melt cavity 81.

The second diagram 6b shows a partial section of the lower curve of the first diagram 6a, wherein here too, the pressure curve of the melt pressure $p_L$ in the melt cavity 81 is shown over the path s of the piston 3 during compressing 240 (curve progression from $p_c$ to $p_d$).

FIG. 7a shows a start position 3a of the piston 3 during the filling process 210 of the printhead 100, wherein the piston crown 35 is positioned at the top of the opening 21 of the piston bushing 4. The entire process sequence from filling 210 to opening 820 of the nozzle during print preparation 260 is also called the refill process, since it is a recurring sequence that is repeated at will during printing of a component 9. The position of piston 3 shown in FIG. 7a is similar to the position of piston 3 in FIG. 1. The opening 21, or the opening cross-section 21 of the piston bushing 4 is open and the granulate 10 can be introduced into the cavity 40 of the piston bushing 4 via the feed device 2. The piston 3 is then controlled by the actuator device 110 to the position 3b shown in FIG. 7b. The piston crown 35 slides past the gate 44 of the piston bushing 4 and the granulate 10 protruding from the opening 21 into the cavity 40 is sheared off between the piston crown 35 and the gate 44. Therefore, this position is called the shear position 3b. After shearing 420, the opening cross-section 21 is closed 220.

The force, pressure curve F, $p_H$ increases from the start position 3a to the shear position 3b, wherein the force applied by the actuator device 110 is highest at the gate 44, or shear position 3b, since the actuator device 110 must apply the force to shear the granulate 10. The amount of force required can be reduced by suitable measures such as optimization of the gate geometry in conjunction with the nature of the piston crown 35 and preheating of the granulate 10. The pressure curve $p_L$ of the melt 12, on the other hand, changes only slightly or hardly increases at all, since the nozzle 8 is still open and no pressure buildup occurs in the melt cavity 81.

Subsequently, the compressing process 240 begins and the piston 3 is moved to position 3c by the actuator device 110 under force or pressure control. When the piston 3 is moved, the force F exerted on the material, or granulate 10, 11, or the hydraulic pressure $p_H$ exerted on the piston 3, as well as the pressure $p_L$ in the melt 12 are measured. By moving the piston 3, the material 10, 11, 12 is pre-compressed.

Position 3c is defined by the increase in force or pressure, i.e. position 3c is actuated, wherein not a direct point but an edge of the curves shown in diagram 6a is actuated. The slope arises at a change point $p_{Lc}$, $F_c$, $p_{Hc}$ from respectively the straight line with low, or no slope (the area from position 3a to position 3c) to the slope of the curve (at position 3c), at which a predefined slope, or a predefined slope angle is reached and/or exceeded. Position 3c is located in the first third of plasticizing zone B. Granulate 10, 11 is compressed in plasticizing zone B by the advancing of piston 3, wherein at the same time melt 12 is located in melting zone D between cavity 40 and nozzle 8. The plasticized granulate 11 are thus forced into the melt 12 in the mixing zone C.

By lowering the piston 3 and, analogously, the piston needle 32 in the direction of the nozzle 8, melt 12 already emerges from the nozzle 8, whereby it is achieved that any air or air pockets that can still be present are displaced from the nozzle head 6. This frees up the nozzle 8.

The position 3c is provided with a tolerance due to the method and material, whereby the position 3c of the piston 3 can be slightly different for different refill processes of the printhead 100 performed one after the other. Position 3c is therefore not a fixed point. If the position 3c is within the specified tolerance, it is ensured that the filling process 210 was successful, i.e. that enough granulate 10 were filled into the cavity 40 and that the melt chamber 81 is already filled with melt 12. If, for example, the flank starts too far before position 3c, there is too much highly viscous, or hard, material 10, 11 in the area from the piston crown 35 to the nozzle 8, and the mixing process in mixing zone C cannot have been successful. If, for example, the flank does not start until well after position 3c, too little material 10 can have been added.

After reaching position 3c, pre-compressing 610 is complete and nozzle 8 of printhead 100 is closed 620.

For compressing 630, the piston 3 is advanced in a pressure-controlled manner starting from position 3c until a predefined peak pressure $p_d$ is reached and the piston crown 35 has been moved to position 3d shown in FIG. 7c. The peak pressure $p_d$ can be between approximately 100 and 300 bar, depending on the material 10 and requirements.

Subsequently, the so-called peak pressure position 3d is held for a material-dependent predefined period of time. In this case, the piston crown 35 projects into the first heating zone 65 and the piston needle 32 projects into the melting cavity 81, and during holding, a part of the melt 12 flows from the melting cavity 81 of the nozzle head 6 through the openings 71 of the kidney piece 7 back into the mixing zone C into the plastic granulate 10 located there. This displaces residual air and homogenizes melt 12 in mixing zone C. This results in a better energy flow and produces a more homogeneous material 11, 12. The refluxing melt 12 becomes plastic and the granule parts 11, which are pushed into the kidney piece 7, become melt-like. This results in mixing of the material 11, 12.

The holding process 640 described here is also used to analyze and perform a system check of the printhead 100, as the following effects can occur when measuring the pressure $p_L$. An increase in the pressure $p_L$ in the melt 12 would mean that the melt 12 is outgassing because, for example, the temperature $T_L$ is too high. Too high melt temperatures $T_L$ are not desired, since air plasma can develop, which would lead to chemical decomposition.

A sharp drop in melt pressure $p_L$ could mean, for example, that the system of printhead 100 is leaking or that there was still too much air in the system. This effect could occur if, for example, too much cold material 10, 11 was present in the cavity 40 because the temperature management of the printhead 100 was not optimally adjusted.

After the predefined time period has elapsed, the piston 3 is moved back 710 from the peak pressure position 3d by the actuator device 110 in a pressure-controlled manner until a target pressure $p_e$ of approximately 0 bar is reached. The system is relaxed. Thereby it is obtained that the melt 12 is depressurized and vented, whereby a pure melt 12, which is now of high quality and printable is produced, especially in process zone E. When the target pressure $p_e$ is reached, the target pressure position 3e shown in FIG. 7d is reached, wherein the piston crown 35 is positioned outside the first heating zone 65 in the area of the stop 43 of the piston bushing 4.

The pressure difference now measured between the pressure $p_d$ of the peak pressure position 3d and the pressure $p_e$ of the target pressure position 3e and the path s traveled between the two points 3d, 3e yields a spring constant 740 of the liquid phase 12 of the material, or melt 12.

The spring constant results from the compressibility of the melt 12 and leads to a correction factor, or shape factor, which is needed to accurately actuate the piston 3 by the actuator device 110.

Given the compressibility of the melt 12, for example, 1.2 volume units of a geometric piston travel s covered by the piston 3 correspond to 1.0 volume units of a discharged volume of the melt 12. Without compressibility, the ratio would be 1:1.

This makes it possible for the actuator device 110 to actuate the piston 3 in a controlled manner, wherein the spring constant makes it possible, among other things, for the real discharge of the melt 12 to achieve the correct, calculated volumetric flow of the melt 12 as a function of a path speed $v_B$ of the moving printhead 100 during printing. In other words, at each printing position, the required amount of melt 12 is applied to the component 9 at each path speed $v_B$ of the printhead 100.

Subsequently, the process of dispensing 270 the melt 12, or the pressure process 270 is prepared 260 via an active decompression 810 by a retraction of the piston 3.

Depending on the spring constant determined, the piston 3 is retracted by approximately 1 to 2 millimeters, whereby it is achieved that no melt 12 escapes from the nozzle 8, or nozzle opening, when it is subsequently opened 820. This would be the case if position 3e were to continue to be held due to the existing open system due to the influence of gravity. At the same time, the melt 12 is relieved of pressure in the same way as a spring.

Then further print preparation by compression 830 begins.

The overall system of the printhead 100 is a compressible system, as previously described, since the melt 12 can have a compression of about 20%, for example. Therefore, the volume displaced by the advancing of the piston 3 does not correspond to the volume of the discharged material 12, whereby inaccurate and irregular discharges can result. The possible volume of melt 12 for an advancing of the printing process 270 is defined by the target position 3e and the path to the end position 3z shown in FIG. 7e.

Due to the effect described above, the melt 12 is compressed during the start of printing. The compression of the melt 12 in the melt chamber 81 at the start of printing is generated in part by friction at the nozzle opening of the nozzle 8 as the melt 12 is "squeezed out", and in part by resistance to printing on the component 9 or a substrate support on which the component 9 is built.

Uniform discharge of the melt 12 is achieved by intelligent regulation of the printhead 100, wherein asynchronous movements of the piston 3 adjusted by a correction factor through the use of an electronic gear on the actuator device 110 take place. The correction factor, which results in particular from the determined spring constant 740 of the melt 12, is basically mixed into the system. Therefore, the printhead 100 according to the invention has no restriction on synchronous movements similar to common NC systems.

The printing process 270 is pressure-controlled, wherein the pressure $p_L$ of the melt 12 is permanently measured by the pressure sensor 83 in the nozzle head 6. The measured pressure $p_L$ is the pressure that results from the discharge of the melt 12 onto the component 9, or onto the substrate carrier (if there is no component yet). Without this effect of printing on an object, there would be no back pressure on the nozzle 8, other than that of a frictional pressure, whereby too much material/melt 12 would be discharged from the nozzle 8.

The printing process 270 is started by actively mixing in melt 12 through the intelligent regulation and actuation of piston 3. In this case, "more" stroke is performed to compensate for the compressibility of the melt 12. In principle, too much melt 12 is pressed out of the nozzle 8, but the pressure sensor 83 is read out parallel to the mixing of the melt 12, whereby corresponding pressure-dependent countermeasures can be taken.

An electrically driven actuator device 110 proves to be dynamic and very effective for this case.

During the printing process 270, the melt temperature $T_S$ is continuously measured and, in the heating zone 2, the melt 12 is controlled to the required target value of the process temperature in the area of the process zone E via the heating elements 63 in the nozzle head 6.

The piston 3 is actuated by the actuator device 110 to start printing in accordance with a path speed $v_B$ of the printhead 100, whereby melt 12 is discharged from the nozzle 8.

During the printing process 270, the control and regulation unit 113 of the printhead 100 is activated and actively intervenes in the actuation of the actuator device 110, for example, to add an additive target value $s_{aK}$, or an additive amount of material 12, as required. If, for example, an additive target value $s_{aK}$ is added and thus more material 12 is discharged or extruded from the nozzle 8 than by continuous actuation, the pressure $p_L$ at the nozzle head 6 also increases as a result. The additive target value $s_{aK}$ is the mixed-in value, or the additional piston travel that must be covered in order to discharge the desired volume of melt 12 in accordance with the correction value, determined from the spring constant. As a result, a steady state is achieved, whereby the amount of melt 12 discharged onto the component 9 remains constant.

This operation is exemplified in the diagrams of FIG. 8. FIG. 8a shows a path-time diagram with a curve of the desired path $s_{KS}$ of piston 3 and below it the additive target value $s_{aK}$, which is added or mixed into the desired path $s_{KS}$ due to the active control of piston 3.

FIG. 8b shows a diagram depicting the path speed $v_B$ of the printhead 100 during printing and the melt pressure $p_L$ during the printing process over time t The path speed $v_B$ of the printhead 100 is nearly constant to point $v_1$ and is reduced from point $v_1$ to point $v_2$. For example, because the printhead 100 is traveling a curve. From point $v_2$, the printhead 100 accelerates again to point $v_3$ and continues to $v_B$ at near constant speed thereafter. Parallel to this, FIG. 8a shows the curve of the target path $s_{KS}$ of the piston 3, which is shown here with a consistent slope. This curve would represent a piston travel of an unregulated printhead whose piston is advanced at constant speed. However, the permanent pressure and temperature measurement determines that the pressure $p_L$, or the pressure profile of the melt pressure $p_L$, changes when decelerates and speeds up the path speed $v_B$ of the printhead 100 (see FIG. 8b). From this change, the additive target value $S_{aK}$ is determined and the piston 3 is controlled accordingly, wherein the additive target value $S_{aK}$ is added or withdrawn from the target path $s_{KS}$ of the piston 3.

As the printhead 100 decelerates, the piston 3 slows down (see negative slope $s_1$ in FIG. 8a), or can even stop or change direction of movement. This is because the path speed $v_B$ is breaking down, thereby reducing the pressure $p_L$. The control or pilot control of the piston 3 prevents too much material 12 from being discharged from the nozzle 8 onto the component 9.

When accelerating the path speed $v_B$ at point $v_2$, the above-described compression of melt 12 begins, whereby it is necessary that the piston 3 must make a larger stroke than an incompressible medium. The control and regulation unit 113 actively engages with and takes control of the system. It provides an increase in the additive target value $s_{aK}$ whereby more material 12 is extruded and as a result the pressure $p_L$ at nozzle 8 is increased.

As a result of advancing the piston 3 and the resulting pressure increase (in point $p_2$) in the melt 12, the virtual "spring" of the melt 12 becomes smaller or stiffer. This resulting technical effect is readjusted by the control and regulation unit 113, whereby the exact amount of the melt 12 required is further discharged from the nozzle 8 during the printing process 270, for example in order to apply equally strong and thick layers to a component 9.

When the path speed $v_B$ is constant again, a curvilinear state is achieved, wherein the pushed out amount of the melt 12 remains constant and the path speed $v_B$ of the printhead 100 remains the same.

The use of the piston needle 32 provides the advantageous effect that direct volume displacement is possible within the melt 12 in the melt chamber 81, whereby a smaller spring constant is achieved. The small spring constant in turn enables the printhead 100 to be highly dynamic. The effect results from the fact that a more direct pressure transfer to the melt 12 occurs through the piston needle 32. Thus, as the piston 3 advances, not only does the piston crown 35 transmit a pressure pulse to discharge the melt 12 from the nozzle 8, but also the piston needle 32, which is positioned closer to the nozzle 8.

The printing process 270 can be performed until the piston crown 35 reaches position 3z, wherein the position 3z is determined such that the piston crown 35 just does not reach a mechanical stop, but comes to a stop shortly before reaching the kidney piece 7, as shown in FIG. 7e. After that, no more material 12 can be discharged and the refill process described above is started again.

FIGS. 9 to 15 show individual flowcharts of the method steps of the method 200 according to the invention in addition to the embodiments of the invention described in the preceding drawings.

Figure 9:
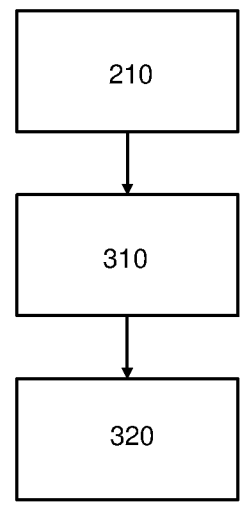
FIG. 9 a flowchart of a method for filling a cavity of the printhead.

FIG. 9 shows a flowchart of a method for filling 210 the cavity 40 with printable material 10 by the feed device 2, wherein the method 210 comprises at least the following steps:

filling 310 the material 10 via the opening 23 of the feed device 2 into the printhead 100 and generating 320 pulses of air 26 to disengage the material 10, particularly the granulate pieces 10 from each other.

The feeding 310 of the granulate pieces 10 is performed manually or automatically, wherein the granule pieces 10 slide into the lower area 24 of the feed device 2 due to the influence of gravity.

The generation 320 of air pulses 26 is performed at intervals, and the granulate pieces 10 are flung up in the area of the air pulses 26 such that, as they fall, they exert an impulse on the granulate pieces 10 beneath them and encourage them to slide down into the heated cavity 40 of the printhead 100.

Figure 10:
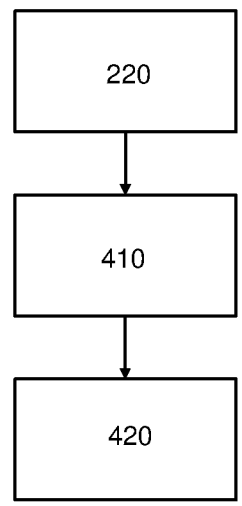
FIG. 10 a flowchart of a method for closing an opening cross-section of a piston bushing of the printhead.

FIG. 10 shows a flowchart of a method for closing 220 the opening cross-section 21 of the piston bushing 4 by the piston 3, wherein the method 220 comprises the following steps:

advancing 410 the piston 3, starting from the starting position 3a of the piston crown 35 of the piston 3 in the direction of the nozzle 8 until reaching the position 3b below the gate 44 of the piston bushing 4, wherein shearing 420 of the granulate 10 is achieved by sliding the piston crown 35 past the gate 44.

Figure 11:
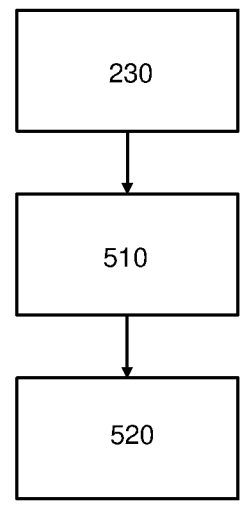
FIG. 11 a flowchart of a process for converting a material from a solid phase via a plastic phase to a liquid phase.

FIG. 11 shows a flowchart of a method for converting 230 the material from a solid phase 10 to a plastic phase 11 to a liquid phase 12, wherein the method 230 comprises the following steps:

heating 510 the material 10, 11, 12 by heating elements 61, 63 of the nozzle head 6 across state zones A, B, C, D, E of the printhead 100, wherein the state zones A, B, C, D, E represent an aggregate state of the material 10 depending on its temperature $T_S$ and the aggregate state of the material 10, 11, 12 is changed across the state zones A, B, C, D, E from a solid phase 10 to a plastic phase 11 to a liquid phase 12 by the application of heating energy of the heating elements 61, 63, and mixing 520 of the material 11, 12 during the compressing 240.

Figure 12:
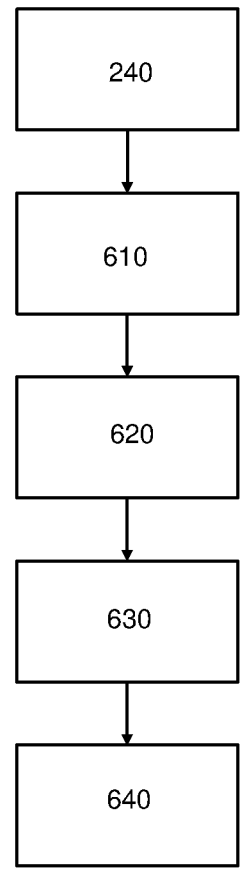
FIG. 12 a flowchart of a method for compressing the material.

FIG. 12 shows a flowchart of a method for compressing 240 the material 10, 11, 12. This compressing process 240 comprises the following steps:

pre-compressing 610 of the material 10, 11, 12 by advancing the piston 3, closing 620 of the nozzle 8, compressing 630 of the material 10, 11, 12 by advancing the piston 3 and holding 640 the piston 3 in the holding position 3d.

The pre-compressing 610 of the material 10, 11, 12 is performed by advancing the piston 3 in a pressure- and/or force-controlled manner, wherein pre-compressing is performed up to position 3c, which is reached when a material-dependent gradient and/or a material-dependent gradient angle of a force and/or pressure curve is reached and/or exceeded.

The compressing 630 of the material 10, 11, 12 is performed in a pressure-controlled manner by advancing the piston 3 with the nozzle 8 closed, and in the process the holding position 3d is approached until a peak pressure $p_d$ is reached, or which is defined by the peak pressure $p_d$.

During compressing 630, the nozzle 8 is closed and the piston needle 32 dips into the melt space 81 of the nozzle head 6 such that a part of the liquid phase 12 from an upper area of the melt space 81 is thereby displaced through openings 71 of the kidney piece 7 from the melt zone D back into the mixing zone C, whereby the part of the liquid phase 12 mixes with the plastic phase 11 from the plasticization zone B in the mixing zone C.

The piston 3 is held in the holding position 3d, wherein during the holding process 640, the pressure $p_L$ and the temperature $T_L$ of the liquid phase 12 are measured and the measured values are checked by the evaluation unit 114 for functional control of the compressing process 240.

While the piston 3 is held 640 in the holding position 3d, the nozzle 8 is closed and the piston needle 32 is immersed in the melting cavity 81 such that this displaces part of the liquid phase 12 from the upper area of the melting cavity 81 through the openings 71 of the kidney piece 7 from the melting zone D back into the mixing zone C, whereby the part of the liquid phase 12 mixes with the plastic phase 11 from the plasticizing zone B in the mixing zone C.

Figure 13:
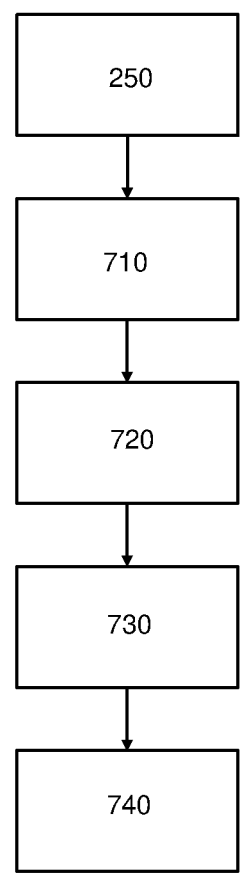
FIG. 13 a flowchart of a method for determining a spring constant of the liquid phase of the material, and FIG. 14 a flowchart of a method for print preparation of the liquid phase of the material and FIG. 15 a flowchart of a method for dispensing the liquid phase.

FIG. 13 shows a flowchart of a method for determining 250 the spring constant of the liquid phase 12, wherein the method 250 comprises the following steps:
  pressure-controlled return 710 from the hold position 3d after terminating the holding process 640 to the target position 3e, which is reached when the melt pressure $p_L$ reaches a target pressure $p_e$,
  determining the pressure difference 720 between the peak pressure $p_d$ and the target pressure $p_e$,
  determining the distance 730 between the stop position 3d and the target position 3e, and
  calculation of the spring constant 740 of the liquid phase 12.

Figure 14:
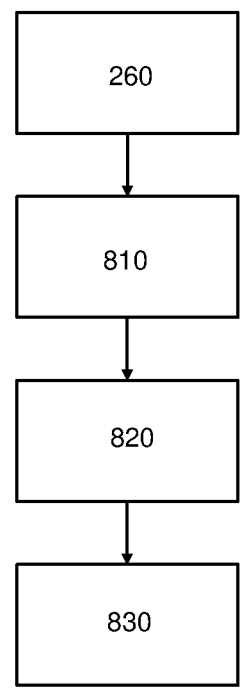

FIG. 14 shows a flowchart of a method for print preparation 260 of the liquid phase 12, wherein the method 260 comprises the following steps:
  active decompression 810 of the liquid phase 12 by retracting the piston 3 as a function of the spring constant,
  opening 820 nozzle 8 and
  compressing 830 the liquid phase 12 at the start of printing.

Figure 15:
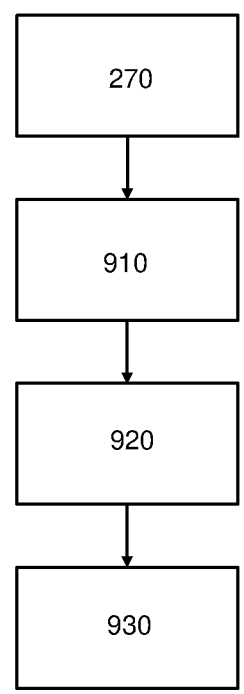

FIG. 15 shows a flowchart of a method of dispensing 270 of liquid phase 12, wherein the printing method 270 is performed in a pressure controlled manner, wherein:
  the pressure $p_L$ in the melting chamber 81 is permanently measured 910, wherein the measured pressure $p_L$ is in relation to the pressure generated by discharge of the liquid phase 12 onto the component 9,
  the piston 3 is actively actuated 920 via the control and regulation unit 113, wherein the advance of the piston 3 is adjusted 930 by a correction factor as a function of pressure, wherein the correction factor results from the spring constant of the liquid phase 12 of the material.

What is claimed is:

1. A method (200) for operating a printhead (100) for a 3D printer, wherein the method (200) comprises the following steps:
  filling (210) a cavity (40) with printable material (10) by a feed device (2);
  closing (220) an opening cross-section (21) of a piston bushing (4) by advance of a piston (3) starting from a starting position (3a) in a direction of a nozzle (8) of the printhead (100);
  converting (230) the material from a solid phase (10) via a plastic phase (11) into a liquid phase (12);
  compressing (240) the material (10, 11, 12);
  determining (250) a spring constant of the liquid phase (12);
  print preparation (260) of the liquid phase (12);
  dispensing (270) the liquid phase (12) of the material (10) from the nozzle (8) for printing a three-dimensional component (9);
  returning (280) the piston (3) to the starting position (3a) and
  repeating (290) the steps (210) to (280) until terminating the method (200),
  wherein the compressing (240) of the material (10, 11, 12) comprises the following steps:
    pre-compressing (610) of the material (10, 11, 12) by advancing the piston (3),
    closing (620) the nozzle (8),
    compressing (630) of the material (10, 11, 12) by advancing the piston (3) and
    holding (640) the piston (3) in a holding position (3d).

2. The method (200) according to claim 1, wherein at least the closing (220), the converting (230), the compressing (240), the determining (250) of the spring constant, the print preparation (260) and the dispensing (270) are performed by an active regulation of an actuator device (110) by a control and regulation unit (113), wherein results from an evaluation unit (114) based on measured values of sensors (36, 82, 83, 111, 112) are transmitted to the control and regulation unit (113).

3. The method (200) according to claim 1, wherein filling (210) of the cavity (40) with printable material (10) by the feed device (2) comprises at least the following steps:
  feeding (310) the material (10) via an opening (23) of the feed device (2) into the printhead (100) and
  generating (320) air pulses (26) to detach granulate pieces (10) of the material 10 from each other.

4. The method (200) according to claim 3, wherein the filling (310) of the granulate pieces (10) is performed manually or automatically, wherein the granulate pieces (10) slide into a lower area (24) of the feed device (2) due to gravity.

5. The method (200) according to claim 4, wherein the generation (320) of air pulses (26) is carried out at intervals and the granulate pieces (10) are flung up in an area of the air pulses (26) in such a way that, as the granulate pieces (10) fall, they exert an impulse on the granulate pieces (10) lying underneath and encourage the granulate pieces (10) to slide into the cavity (40) of the printhead (100).

6. The method (200) according to claim 1, wherein the closing (220) of the opening cross-section (21) of the piston bushing (4) by the piston (3) comprises the following steps:
  advancing (410) the piston (3), starting from the starting position (3a) of a piston crown (35) of the piston (3) in the direction of the nozzle (8) until a position (3b) below a gate (44) of the piston bushing (4) is reached, wherein
  a shearing (420) of granulate pieces (10) is achieved by the piston crown (35) sliding past the gate (44).

7. The method (200) according to claim 1, wherein the converting (230) of the material from a solid phase (10) via a plastic phase (11) to a liquid phase (12) comprises the following steps:
  heating (510) the material (10, 11, 12) by heating elements (61, 63) of a nozzle head (6) across state zones (A, B, C, D, E) of the printhead (100), wherein the state zones (A, B, C, D, E) represent an aggregate state of the material (10) depending on temperature $T_S$, and an aggregate state of the material (10, 11, 12) is changed across the state zones (A, B, C, D, E) from a solid phase (10) via a plastic phase (11) into a liquid phase (12) by introduction of heating energy of the heating elements (61, 63) and mixing (520) the material (11, 12) during compressing (240).

8. The method (200) according to claim 1, wherein the pre-compressing (610) of the material (10, 11, 12) is performed by advancing the piston (3) in a pressure-and/or force-controlled manner, wherein pre-compressing is performed up to a position (3c) that is reached when a material-dependent gradient, and/or a material-dependent gradient angle of a force, and/or a pressure curve is reached and/or exceeded.

9. The method (200) according to claim 1, wherein the compressing (630) of the material (10, 11, 12) is performed in a pressure-controlled manner by advancing the piston (3) with the nozzle (8) closed, and the holding position (3d) is thereby approached until a peak pressure ($p_d$) is reached.

10. The method (200) according to claim 1, wherein, during compressing (630), the nozzle (8) is closed and a piston needle (32) dips into a melt cavity (81) of a nozzle head (6) such that a part of the liquid phase (12) from an upper area of the melting cavity (81) is thereby displaced through openings (71) of a kidney piece (7) from a melting zone (D) back into a mixing zone (C), whereby the part of the liquid phase (12) mixes with the plastic phase (11) from a plasticizing zone (B) in the mixing zone (C).

11. The method (200) according to claim 1, wherein a pressure ($P_L$) and a temperature ($T_L$) of the liquid phase (12) are measured during the holding process (640), and wherein the measurements of the pressure ($P_L$) and the temperature ($T_L$) of the liquid phase (12) are checked by an evaluation unit (114) for functional control of the compressing process (240).

12. The method (200) according to claim 1, wherein, while the piston (3) is held (640) in the holding position (3d), the nozzle (8) is closed and a piston needle (32) is immersed in a melt cavity (81) such that a part of the liquid phase (12) from an upper area of the melting cavity (81) is thereby displaced through openings (71) of a kidney piece (7) from a melting zone (D) back into a mixing zone (C), whereby the part of the liquid phase (12) mixes with the plastic phase (11) from a plasticizing zone (B) in the mixing zone (C).

13. The method (200) according to claim 1, wherein the determining (250) of a spring constant of the liquid phase (12) comprises the following steps:
    pressure-controlled return (710) from the holding position (3d) after terminating the holding process (640) to a target position (3e), which is reached when a melt pressure ($P_L$) reaches a target pressure ($p_e$),
    determining a pressure difference (720) between a peak pressure ($p_d$) and the target pressure ($p_e$),
    determining a distance (730) between the holding position (3d) and the target position (3e), and
    calculating the spring constant (740) of the liquid phase (12).

14. The method (200) according to claim 1, wherein the print preparation (260) of the liquid phase (12) comprises the following steps:
    active decompression (810) of the liquid phase (12) by retracting the piston (3) as a function of the spring constant,
    opening (820) nozzle (8) and
    compressing (830) the liquid phase (12) at a start of printing.

15. The method (200) according to claim 2, wherein the dispensing (270) of the liquid phase (12) is performed pressure controlled, wherein:
    a pressure ($P_L$) in a melting cavity (81) is permanently measured (910),
    the piston (3) is actively actuated (920) via the control and regulation unit (113), wherein the advance of the piston (3) is adjusted (930) by a correction factor as a function of pressure, wherein the correction factor results from the spring constant of the liquid phase (12) of the material.

16. A method (200) for operating a printhead (100) for a 3D printer, wherein the method (200) comprises the following steps:
    filling (210) a cavity (40) with printable material (10) by a feed device (2);
    closing (220) an opening cross-section (21) of a piston bushing (4) by advance of a piston (3) starting from a starting position (3a) in a direction of a nozzle (8) of the printhead (100);
    converting (230) the material from a solid phase (10) via a plastic phase (11) into a liquid phase (12);
    compressing (240) the material (10, 11, 12);
    determining (250) a spring constant of the liquid phase (12);
    print preparation (260) of the liquid phase (12);
    dispensing (270) the liquid phase (12) of the material (10) from the nozzle (8) for printing a three-dimensional component (9);
    returning (280) the piston (3) to the starting position (3a) and
    repeating (290) the steps (210) to (280) until terminating the method (200),
    wherein the determining (250) of a spring constant of the liquid phase (12) comprises the following steps:
    pressure-controlled return (710) from the holding position (3d) after terminating the holding process (640) to a target position (3e), which is reached when a melt pressure ($P_L$) reaches a target pressure ($p_e$),
    determining a pressure difference (720) between a peak pressure ($p_d$) and the target pressure ($p_e$),
    determining a distance (730) between the holding position (3d) and the target position (3e), and
    calculating the spring constant (740) of the liquid phase (12).

17. A method (200) for operating a printhead (100) for a 3D printer, wherein the method (200) comprises the following steps:
    filling (210) a cavity (40) with printable material (10) by a feed device (2);
    closing (220) an opening cross-section (21) of a piston bushing (4) by advance of a piston (3) starting from a starting position (3a) in a direction of a nozzle (8) of the printhead (100);
    converting (230) the material from a solid phase (10) via a plastic phase (11) into a liquid phase (12);
    compressing (240) the material (10, 11, 12);
    determining (250) a spring constant of the liquid phase (12);
    print preparation (260) of the liquid phase (12);
    dispensing (270) the liquid phase (12) of the material (10) from the nozzle (8) for printing a three-dimensional component (9);
    returning (280) the piston (3) to the starting position (3a) and
    repeating (290) the steps (210) to (280) until terminating the method (200),
    wherein the print preparation (260) of the liquid phase (12) comprises the following steps:
    active decompression (810) of the liquid phase (12) by retracting the piston (3) as a function of the spring constant, opening (820) nozzle (8) and compressing (830) the liquid phase (12) at a start of printing.

\* \* \* \* \*